(12) United States Patent
Guglielmo et al.

(10) Patent No.: US 11,056,727 B2
(45) Date of Patent: Jul. 6, 2021

(54) MODULAR LITHIUM-ION BATTERY SYSTEM FOR FORK LIFTS

(71) Applicant: EControls, LLC, San Antonio, TX (US)

(72) Inventors: Kennon Guglielmo, San Antonio, TX (US); Adam Schumann, San Antonio, TX (US); Brent Ludwig, San Antonio, TX (US); Matthew Martin, San Antonio, TX (US)

(73) Assignee: EControls, LLC, San Antonio, TX (US)

( * ) Notice: Subject to any disclaimer, the term of this patent is extended or adjusted under 35 U.S.C. 154(b) by 0 days.

(21) Appl. No.: 16/193,071

(22) Filed: Nov. 16, 2018

(65) Prior Publication Data

US 2019/0103639 A1   Apr. 4, 2019

Related U.S. Application Data

(63) Continuation of application No. PCT/US2018/042188, filed on Jul. 13, 2018.
(Continued)

(51) Int. Cl.
*H01M 10/42* (2006.01)
*H01M 10/0525* (2010.01)
(Continued)

(52) U.S. Cl.
CPC ..... *H01M 10/4257* (2013.01); *H01M 10/425* (2013.01); *H01M 10/482* (2013.01);
(Continued)

(58) Field of Classification Search
CPC ....... H01M 2/1077; H01M 2010/4271; H01M 2010/4278
See application file for complete search history.

(56) References Cited

U.S. PATENT DOCUMENTS

| 3,885,204 A | 5/1975 | Abels et al. |
| 3,997,888 A | 12/1976 | Kremer |

(Continued)

FOREIGN PATENT DOCUMENTS

| CN | 103625260 A | 3/2014 |
| DE | 102005053305 A1 | 5/2007 |

(Continued)

*Primary Examiner* — Stephan J Essex
(74) *Attorney, Agent, or Firm* — William H. Quirk; Jesse L. Frizzell; Rosenthal Pauerstein Sandoloski Agather, LLP

(57) ABSTRACT

Many embodiments involve rechargeable battery assemblies that are forklift-battery-sized but that comprise multiple removable battery modules. The removable battery modules are individually rechargeable and are interchangeable with each other. A housing contains six battery modules installed vertically on the front side of the assembly, with their electrical and data connections occurring within the housing on the rear side. Assemblies will be two sided so that the system has two racks with six modules per rack. The handles of each module are collapsible and on the top edges of the overall assembly so that they are readily accessible during removal. Each battery module has an integrated battery supervisor system (BSS). A Battery Operating System Supervisor (BOSS) module processor serves as a battery management system for the all the battery modules. The BOSS module grants permissions to battery modules to enable them to connect and disconnect from busbars at the appropriate times to prevent electrical issues.

16 Claims, 24 Drawing Sheets

Related U.S. Application Data

(60) Provisional application No. 62/692,702, filed on Jun. 30, 2018, provisional application No. 62/532,199, filed on Jul. 13, 2017.

(51) Int. Cl.

| | | |
|---|---|---|
| *H01M 10/48* | (2006.01) | |
| *H01M 2/10* | (2006.01) | |
| *H01M 2/20* | (2006.01) | |
| *H01M 4/58* | (2010.01) | |
| *H02J 7/00* | (2006.01) | |
| *H01M 50/20* | (2021.01) | |
| *H01M 50/502* | (2021.01) | |

(52) U.S. Cl.
CPC ......... *H01M 50/20* (2021.01); *H01M 50/502* (2021.01); *H02J 7/0021* (2013.01); *H01M 4/5825* (2013.01); *H01M 10/0525* (2013.01); *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 4,086,524 A | | 4/1978 | Kremer |
| 4,186,333 A | | 1/1980 | Kremer |
| 4,244,040 A | | 1/1981 | Fondiller et al. |
| 4,461,958 A | | 7/1984 | Krohling et al. |
| 6,125,030 A | * | 9/2000 | Mola ........................ B60R 7/04 |
| | | | 16/357 |
| 6,162,559 A | | 12/2000 | Vutetakis et al. |
| 6,345,677 B1 | | 2/2002 | Eckersley et al. |
| 6,361,897 B1 | | 3/2002 | Snyder |
| 6,392,347 B2 | | 5/2002 | Arping et al. |
| 6,482,541 B1 | | 11/2002 | Bator et al. |
| 6,637,807 B2 | | 10/2003 | Gotz |
| 6,641,951 B1 | | 11/2003 | Vutetakis et al. |
| 6,841,293 B1 | | 1/2005 | Dreulle et al. |
| 7,014,946 B2 | | 3/2006 | Partington et al. |
| 7,023,174 B2 | | 4/2006 | Fromme et al. |
| 7,128,179 B2 | | 10/2006 | Szymanski |
| 7,163,088 B2 | | 1/2007 | Jahns et al. |
| 7,175,379 B2 | | 2/2007 | Sellhorn et al. |
| 7,258,184 B2 | | 8/2007 | Shorney et al. |
| 7,338,248 B2 | | 3/2008 | Buchmann et al. |
| 7,548,429 B2 | | 6/2009 | Miller |
| 7,740,142 B2 | | 6/2010 | Miller et al. |
| 7,872,449 B2 | | 1/2011 | Gutlen |
| D642,120 S | | 7/2011 | Kretschmer |
| 8,113,311 B2 | | 2/2012 | Herrmann et al. |
| 8,763,759 B2 | | 7/2014 | Viereck et al. |
| 2001/0052968 A1 | | 12/2001 | Shiozawa |
| 2003/0132041 A1 | | 7/2003 | Beihoff et al. |
| 2004/0173408 A1 | | 9/2004 | Szymanski et al. |
| 2005/0008465 A1 | | 1/2005 | Szymanski et al. |
| 2007/0188130 A1 | | 8/2007 | Scheucher |
| 2008/0011553 A1 | | 1/2008 | Mielke |
| 2008/0179118 A1 | | 7/2008 | Herrmann |
| 2008/0268330 A1 | * | 10/2008 | Hansen ............. H01M 10/0413 |
| | | | 429/97 |
| 2012/0244398 A1 | * | 9/2012 | Youngs .................. G01K 1/146 |
| | | | 429/61 |
| 2012/0248868 A1 | | 10/2012 | Mobin et al. |
| 2012/0299531 A1 | | 11/2012 | Prosser et al. |
| 2013/0236745 A1 | * | 9/2013 | Norton ................ H01M 2/1077 |
| | | | 429/7 |
| 2014/0079977 A1 | * | 3/2014 | Tsujimura ......... H01M 10/6562 |
| | | | 429/120 |
| 2015/0093653 A1 | | 4/2015 | Coowar et al. |
| 2015/0318521 A1 | | 11/2015 | Zeiler et al. |
| 2018/0241074 A1 | | 8/2018 | Zhang et al. |

FOREIGN PATENT DOCUMENTS

| | | |
|---|---|---|
| EP | 0620604 A2 | 10/1994 |
| EP | 2261167 A1 | 12/2010 |
| EP | 2650251 A1 | 10/2013 |
| EP | 2700611 A1 | 2/2014 |
| WO | 2017004078 A1 | 1/2017 |
| WO | 2017106104 A1 | 6/2017 |

\* cited by examiner

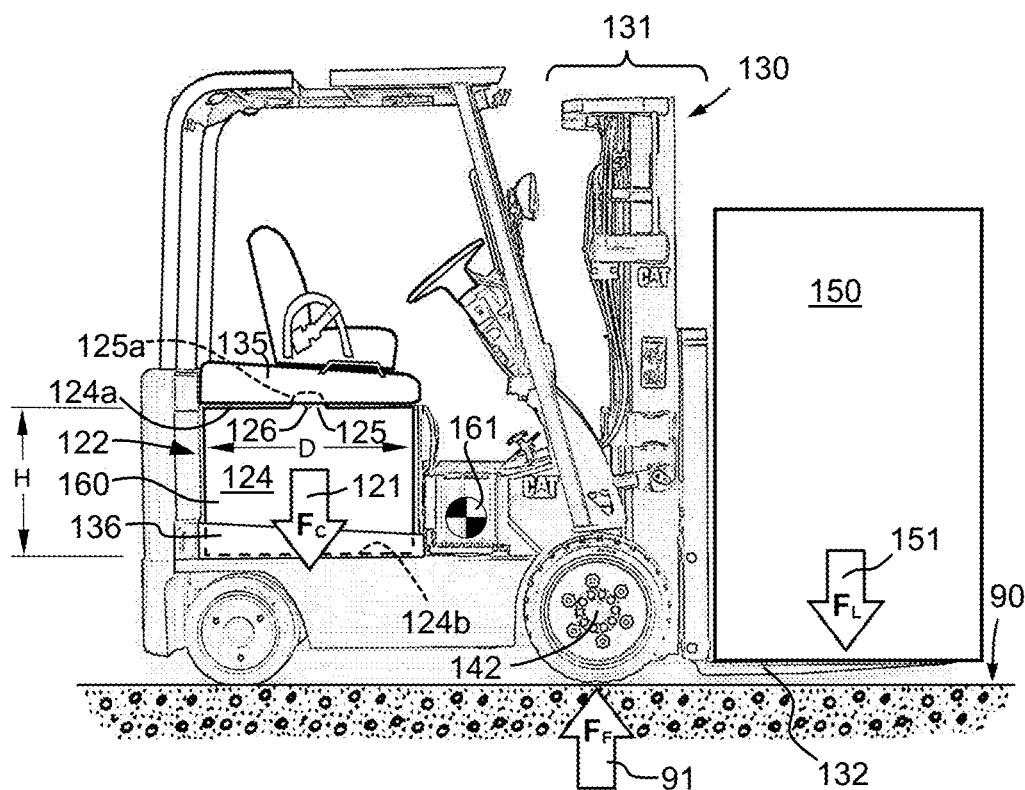
Fig. 2 – Prior Art
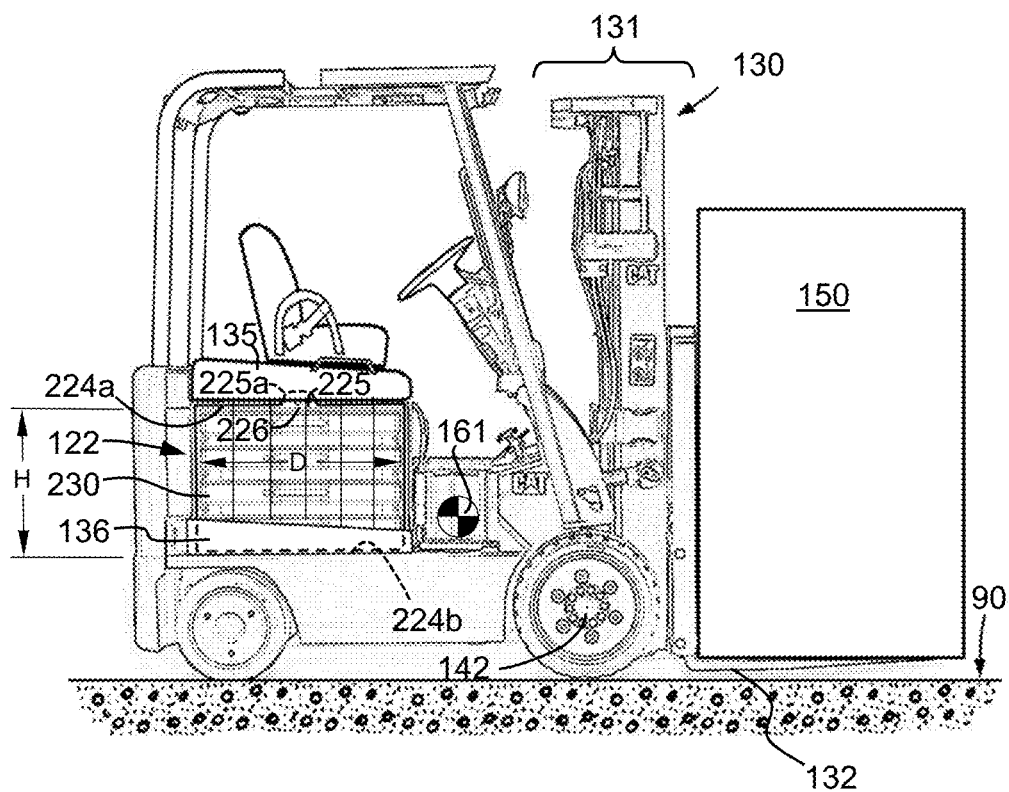
Fig. 3

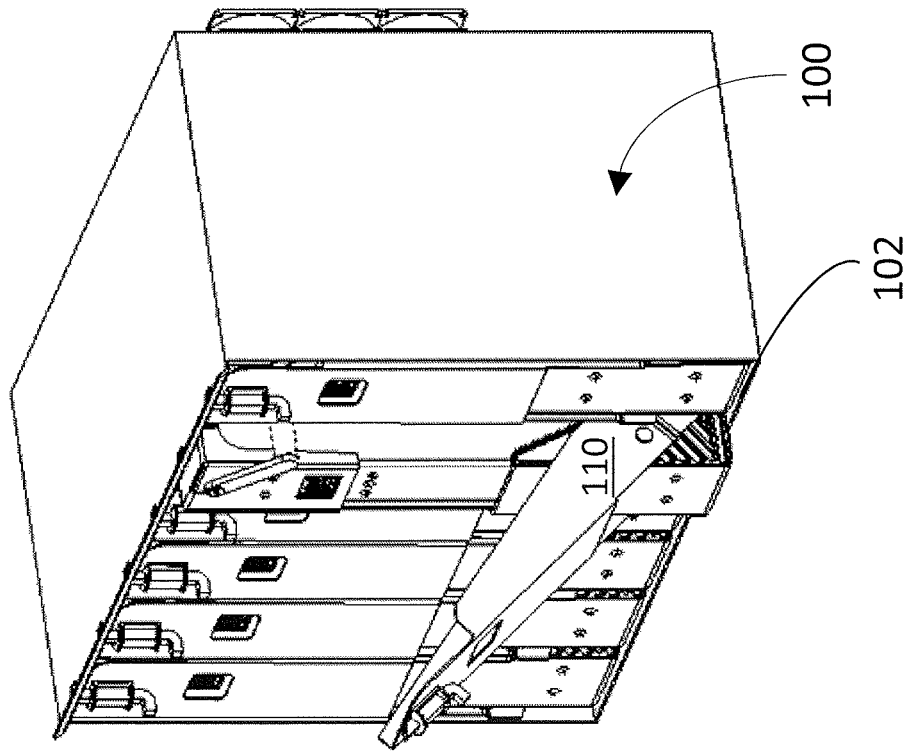
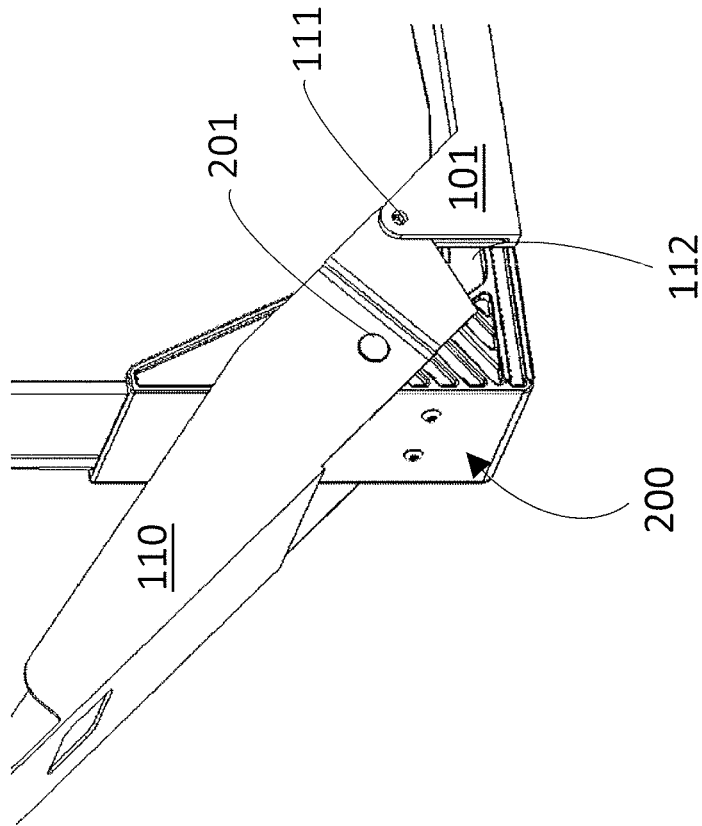
FIG. 5A
FIG. 5B

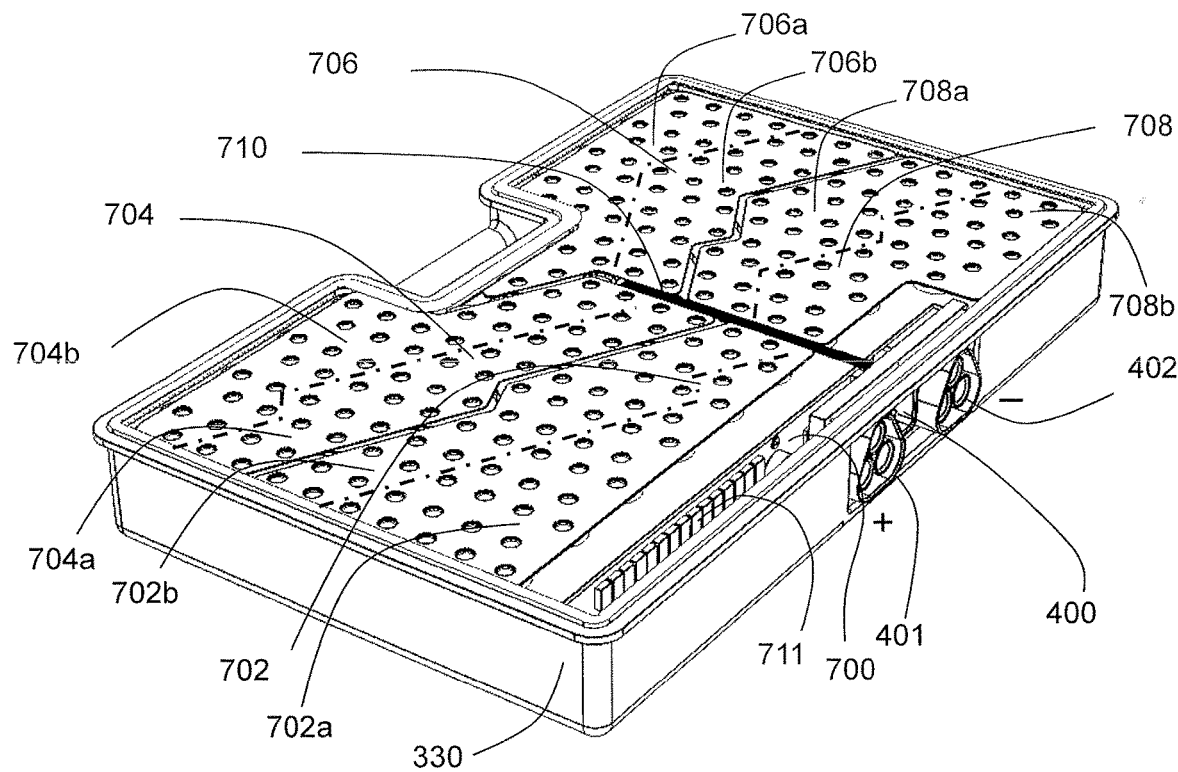
Fig. 24A – Top View of Battery Module Interior
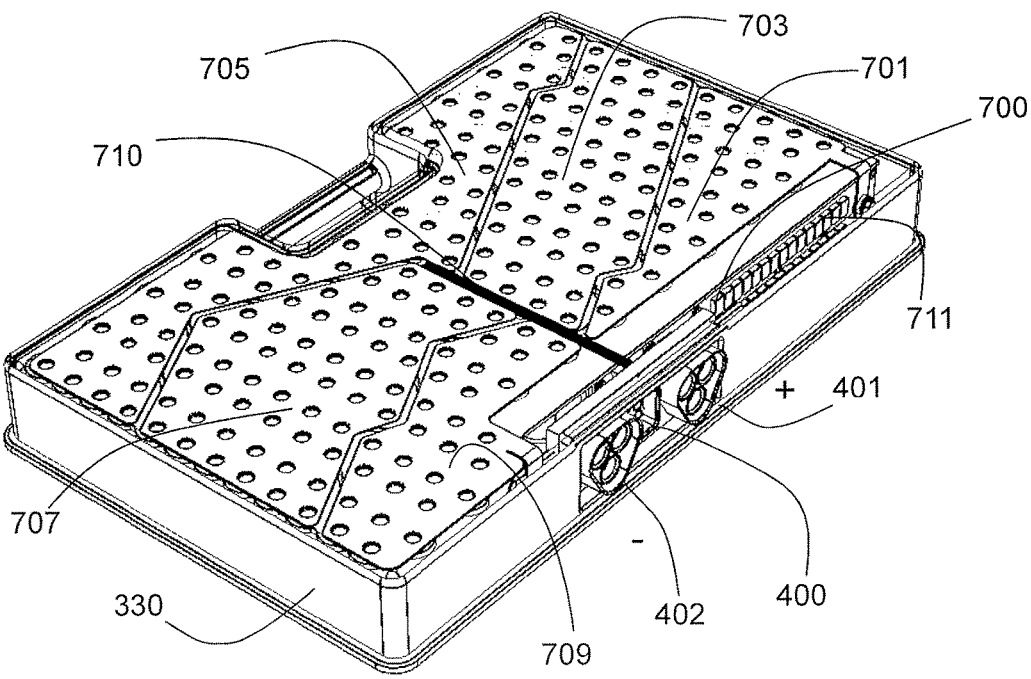
Fig. 24B – Bottom View of Battery Module Interior

MODULAR LITHIUM-ION BATTERY SYSTEM FOR FORK LIFTS

CLAIM OF PRIORITY TO PRIOR APPLICATIONS

The present application claims the benefit of PCT application, PCT/US18/42188, filed on Jul. 13, 2018, previously filed U.S. Provisional Application Ser. No. 62/532,199, filed on Jul. 13, 2017, as well as previously filed U.S. Provisional Application Ser. No. 62/692,702, filed on Jun. 30, 2018. By this reference, the full disclosures, including the claims and drawings, of PCT/US18/42188, U.S. Provisional Application Ser. Nos. 62/532,199 and 62/692,702, are incorporated herein as though now set forth in their entirety.

BACKGROUND OF THE INVENTION

1. Field of the Invention

The present invention relates to battery-powered industrial trucks and their rechargeable batteries, as well as to related aspects of their use. More particularly, the invention is most directly related to Class I forklifts but may also find applicability in relation to other classes of battery-powered industrial trucks.

2. Description of Related Art

Before reviewing the particular field of the invention, it may be helpful to consider background information on rechargeable lithium-ion batteries in general. Rechargeable lithium-ion batteries were developed in the 1970's, and many of their benefits and potential industrial uses were well understood even then. Although commercial adoption was initially slow, they became much more widely popular by the 1990's. They are principally characterized by reference to the type of intercalated lithium compound used as the cathodes in their battery cells. Lithium metal oxides have been the most successful, with lithium cobalt oxide (LCO, or $LiCoO_2$) being most popular for use in industry, although its use has not been without drawbacks, particularly with respect to thermal runaway and related safety concerns. Through the course of development, substantial improvements have been realized by doping of lithium cathode formulations with additional metals such as nickel, manganese, and aluminum. Various innovations have also involved core-shell particle cathodes, improved anodes, and the use of solid lithium polymer electrolytes, and still other innovations have led to smaller cathode particle sizes, increased electrode surface areas, and other improvements in overall battery capacity.

Today, the most popular lithium-ion batteries are of the LCO type, with lithium nickel cobalt aluminum oxide (NCA, or $LiNiCoAlO_2$) and lithium nickel manganese cobalt oxide (NMC, or $LiNiMnCoO_2$) being particularly popular. Other alternative cathode compositions have included other lithium metal oxides such as lithium manganese oxide (LMO) and lithium manganese nickel oxide (LMNO), and other lithium-ion chemistries can be considered for particular needs. Lithium metal phosphates, for instance, have also long been theoretically available for improved cycle counts, shelf life, and safety, although other performance trade-offs have made them less popular than LCO types amongst manufacturers. As one particular type of lithium metal phosphate, lithium iron phosphate (LFP, or $LiFePO_4$) batteries have long been known as an available type of rechargeable lithium-ion battery, with various pros and cons relative to NCA, NMC and other LCO batteries, which have generally weighed against use of LFP.

As a particular example of successful implementation of lithium-ion batteries in other fields, Tesla, Inc. has popularized the use of NCA batteries for its Model S electric cars. Their NCA batteries work well largely due to their high energy density, although they tend to have relatively low thermal stability, with a thermal runaway temperature of around 150° C. Tesla's battery manufacturing method helps balance the benefits and risks by safely interconnecting hundreds of smaller battery cells in a much larger assembly, in a way that enables the necessary energy density while minimizing the risk of arcing and overheating. Within the larger assembly, the hundreds of smaller battery cells are connected in groups, each group including a parallel arrangement of numerous cells connected by wire bonds to adjacent busbars. The busbars of those groups are then combined in series to produce a much larger assembly that meets the power demands for an electric car. The method permanently connects each terminal of each cell into the overall assembly, although rather than using traditional methods of soldering, resistive spot welding, or laser welding, Tesla uses ultrasonic vibration welding, and the wire bonds are made of low resistance wire that allows for expected currents to pass through without significant overheating. Each wire bond is only about a centimeter in length, with one end bonded to the battery terminal and the other end bonded to an aluminum busbar conductor, which in turn is electrically joined in a circuit with other busbars. In the event of overcurrent such as with a short circuit or the like, each wire bond can serve as a fuse that breaks to prevent excessive overheating.

Although LFP batteries tend to have lower energy densities than NCA and NMC batteries, they have also long been known to have greater thermal stability. Thermal runaway for LFP batteries typically does not occur until around 270° C., which improves safety and decreases the likelihood of catastrophic failure. LFP batteries are also more stable under short circuit or overcharge conditions and will not readily decompose at high temperatures. As other arguable advantages, LFP batteries also tend to have greater power density (i.e., they can source higher power levels per unit volume) as well as greatly increased cycle life in comparison to lead-acid batteries. While common lead-acid batteries have an average life of 300 cycles with 20% degradation of stored charge, LFP batteries can last over 2000 cycles with the same 20% degradation of stored charge.

Meanwhile in the field of the present invention, despite long availability of lithium ion batteries in general, Class I forklifts are still typically powered by lead-acid batteries. One reason is that many forklifts, especially Class I forklifts, require a substantial counterbalance for safe use. While lead-acid forklift batteries commonly weigh more than a thousand pounds, many forklifts have therefore been designed to use the weight of lead-acid batteries to maintain stability. However, their massive weight also presents numerous challenges, particularly in the context of extracting, replacing and otherwise handling them. While personnel cannot safely lift anything near that heavy, special hoists and battery changing equipment are required, which in turn involves more expense and floor space, not to mention the risks of back injury and the like.

Beyond the weight-related risks, because of the corrosive nature of sulfuric acid, lead-acid batteries also present risks of damage to eyes, lungs, skin and clothing of personnel who work with them. Plus, hydrogen gas is commonly released during battery recharge, which can combine explosively with oxygen, as well as cause accelerated corrosion of surrounding components. Consequently, special safety protocols are needed with lead acid batteries, and special attention is needed to ensure adequate ventilation of hydrogen and sulfuric fumes around forklifts and their recharging stations.

Moreover, lead-acid forklift batteries are also expensive in terms of time, space and inventory. A lead-acid forklift battery can generally only be used continuously for around six hours before requiring 8-9 hours to recharge. They can also require extensive hours of maintenance and have a much shorter life cycle when compared to lithium-ion technologies. They also tend to require dedication of large areas in warehouses for charging and maintenance, and each forklift generally requires two spare batteries for a facility conducting 24-hour operations.

As a result of many of the above-mentioned and other reasons, others have long considered use of lithium-ion forklift batteries as an alternative, but any resulting attempts have been weak at best, and many of the challenges of the characteristically massive lead-acid forklift batteries still plague forklift-related industries.

Therefore, despite the well-known characteristics and long availability of rechargeable LFP and other lithium-ion battery technologies, there are still substantial and long-felt unresolved needs for battery technology improvements in the forklift industry. Commonly owned U.S. Provisional Patent Application 62/532,199 is incorporated herein by reference in its entirety.

SUMMARY OF THE INVENTION

The innovations of the present invention improve safe and reliable operations of conventional electric forklifts in various ways, in part by enabling rechargeable lithium-ion forklift batteries that are interchangeable with lead-acid forklift batteries for which such forklifts are conventionally adapted to be used. Many embodiments of the present invention involve rechargeable battery assemblies that are forklift-battery-sized but that comprise multiple removable battery modules. The removable battery modules are individually rechargeable and are interchangeable with each other. Each such battery module is self-contained, is equipped with an integral handle for easy removal from the outer assembly, and is preferably sized and otherwise adapted to be manually removable by forklift operators and maintenance personnel. Hence, each individual battery module can be selectively removed for purposes of recharging it or replacing it with a fully charged replacement module.

Preferred adaptations are such that, if the operator or maintenance personnel desires to recharge the entire assembly, that entire assembly can be removed and recharged in the same manner as conventional lead-acid forklift batteries, or the preferred method of charging the entire assembly while it remains in the forklift; whereas one or more of the separately removable modules can alternatively be removed by hand for recharge or replacement. Aspects of the invention further allow for removal of multiple modules out of the larger battery assembly, to allow for its recharge or replacement, while still allowing continued forklift operation. Moreover, due to other innovative aspects of Applicant's approach, the individual battery modules and/or the larger assembly can be recharged with lithium-ion chargers but are also readily compatible to be recharged with conventional lead acid battery chargers.

Preferred embodiments of the larger battery assemblies include a housing that is forklift-battery-sized, together with a symmetrical arrangement of individually removable and interchangeable modules. Preferably, the housing contains six battery modules installed vertically on the front side of the assembly, with their electrical and data connections occurring within the housing on the rear side. Preferred embodiments will be two sided so that the system has two racks with six modules per rack for a total of 12 modules. The handles of each module are collapsible and oriented on the top edges of the overall assembly so that they are readily accessible during manual removal of the corresponding modules.

A preferred embodiment has battery modules secured in place using doors with latches. Each battery module has a low friction surface to ensure smooth and controlled movement during release of the battery modules. There is interlock functionality built into pins in a low voltage connector. This interlock is wired so that three conditions must be met before the battery module will engage the communication bus. These conditions include mating of the low current connector, engagement of the physical locking system on the housing rack, and successful link to the communication bus. The interlock pin loops through the physical latch in the slot where the module connects so that the BOSS module knows that the module is connected. When a module is inserted and the latch closes, the interlock pin is shorted with module ground pin. This mechanism helps prevent arcing in many embodiments of the present invention. Without associated benefits, arcing might otherwise lead to overcurrent scenarios which, in turn, run the risk of causing destruction of electrical connectors in the absence of proper safeguards.

Each battery module has an integrated battery supervisor system (BSS). The system monitors the health to include cell voltage, current, and temperature. During charging, the system monitors the state of charge, compensates for voltage differences, and ensures the pack remains operational if and only if the battery cells are properly balanced and within the operating temperature limits. Additionally, the system can retain and communicate history and information to lift trucks and chargers through a physical CAN bus.

Battery modules of preferred embodiments are connected in a combination of series and parallel to achieve higher voltage, higher capacity, and higher ampacity. Each battery module is self-sufficient containing its own internal controllers. However, there will be some redundant monitoring and control conducted by secondary controllers, e.g. motor controllers and/or chargers.

Within each module, individual battery cells are connected using an approach that is comparable to the Tesla method of wire bonded battery manufacture. An important difference from Tesla, however, involves the use of LFP battery technologies rather than NCA or other LCO battery technologies, as previously discussed. Amidst a number of resulting performance differences, it is notable that in the preferred embodiment, removal of up to four modules per housing rack for charging still allows continued operation of the forklift, since such removal does not decrease the voltage below the overall requirements. The assembly requires a minimum number of two 24 Volt battery modules for continuous operation. Located between the battery cells and the printed circuit board (PCB) are plastic battery trays and a thermally conductive adhesive. A thermally conductive, electrically insulative adhesive is used between the top plastic battery tray and the PCB. Additionally, the same adhesive is used between the battery cells and the top and bottom plastic battery trays. A thermal gap filler is applied between the bottom of the battery cells and the module enclosure for the purpose of thermal management.

BRIEF DESCRIPTIONS OF THE DRAWINGS

FIG. 1 shows a perspective view of a preferred embodiment of the disclosed assembly with closed doors. The assembly includes a housing rack containing six separable battery modules.

FIG. 2 shows a side view of a Class I forklift in a configuration representative of the prior art, showing its inclusion of a conventional lead-acid forklift battery in an openable battery compartment with arrows conceptually illustrating the relationship between its counterweight, the weight of its load, and the resulting center of mass in comparison to the force of the opposing fulcrum created at the front wheels of the forklift.

FIG. 3 is a side view of a Class I forklift without the conventional lead acid forklift battery of FIG. 2, instead incorporating a rechargeable battery assembly according to the teachings of the present invention.

FIGS. 5A and 5B show a door of housing in a halfway open position and the location of the door pin.

Figure 15:
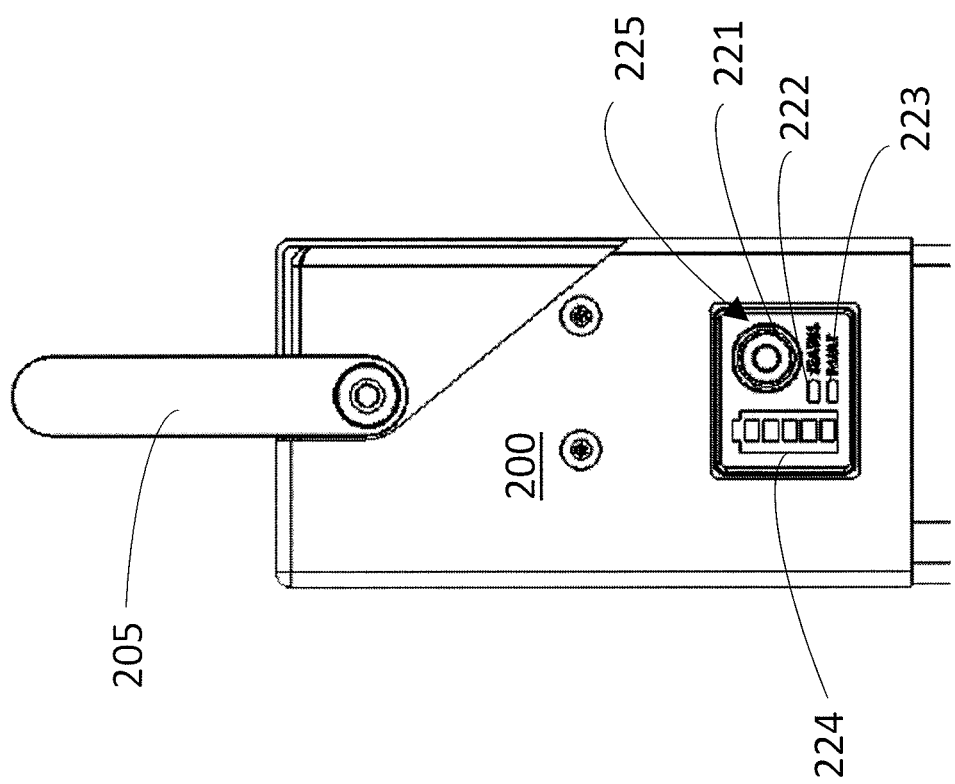
FIG. 15 shows a sectional front view of a battery module.
Figure 20:
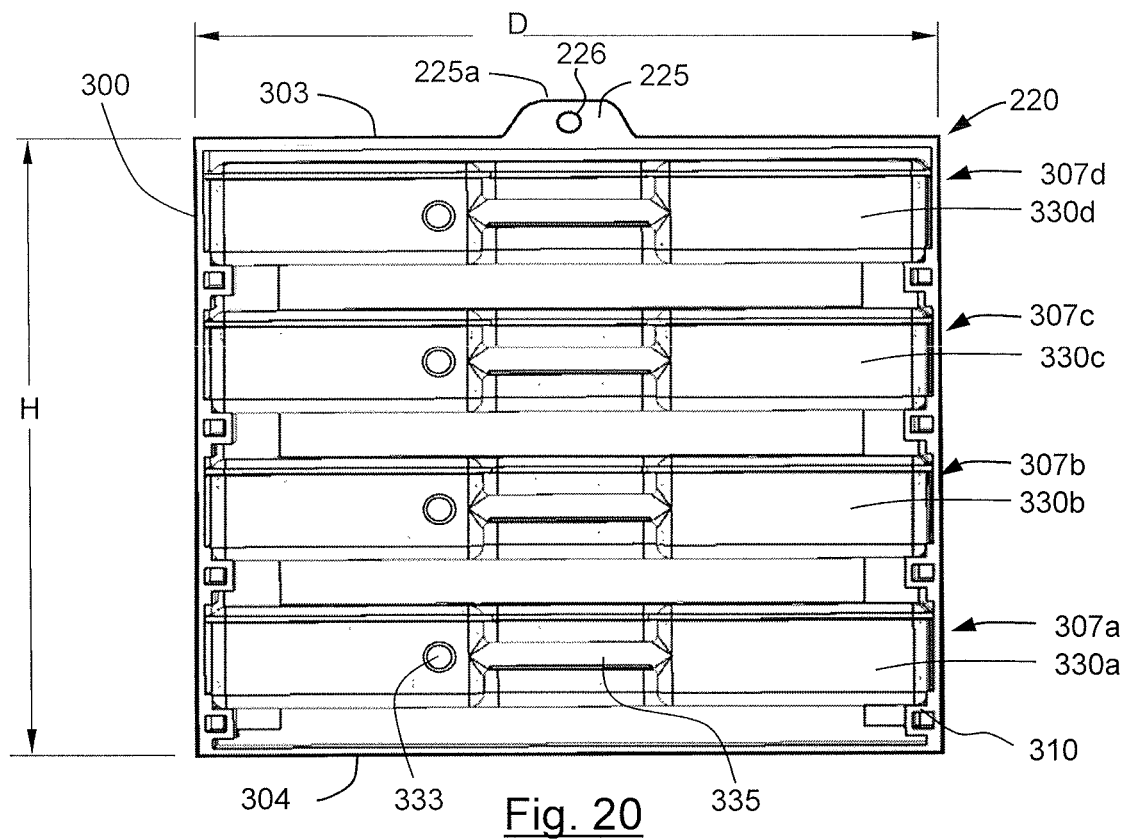

FIG. 20 is an elevation view of the rechargeable battery assembly 220 of an alternative embodiment. The assembly 220 is a variation that incorporates eight separable battery modules 330, while FIG. 15 shows the outer housing rack 300 and one half of those eight battery modules 330 (namely modules 330a-330d) operatively positioned therein.

Figure 21:
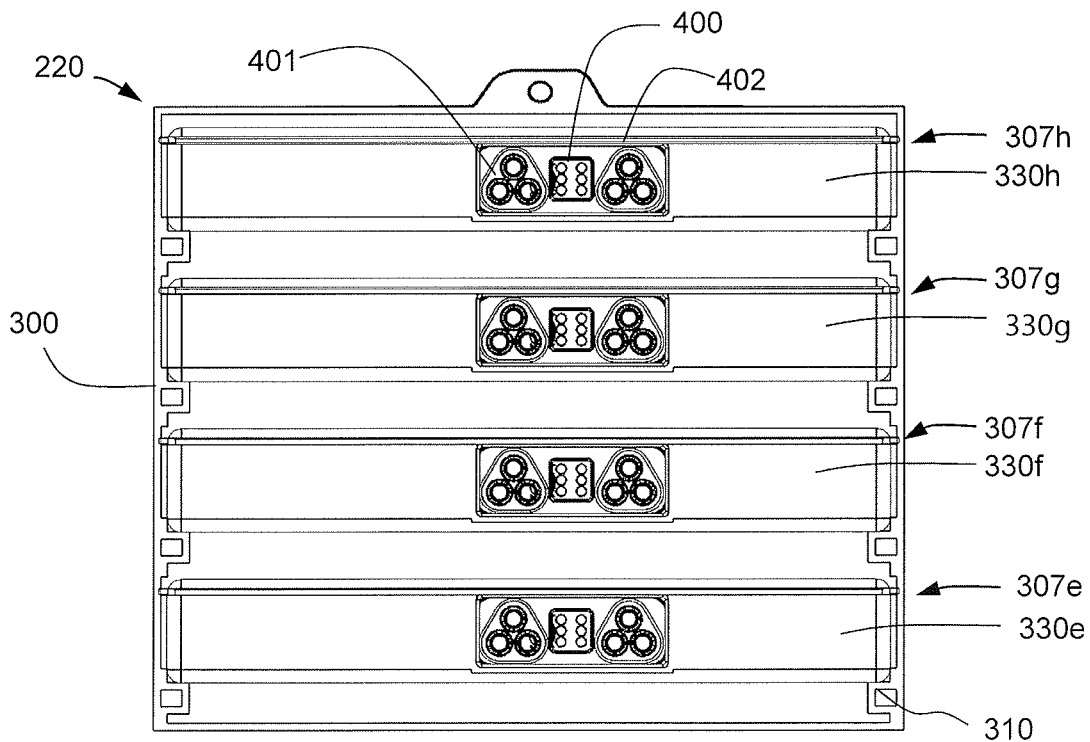
Figure 22:
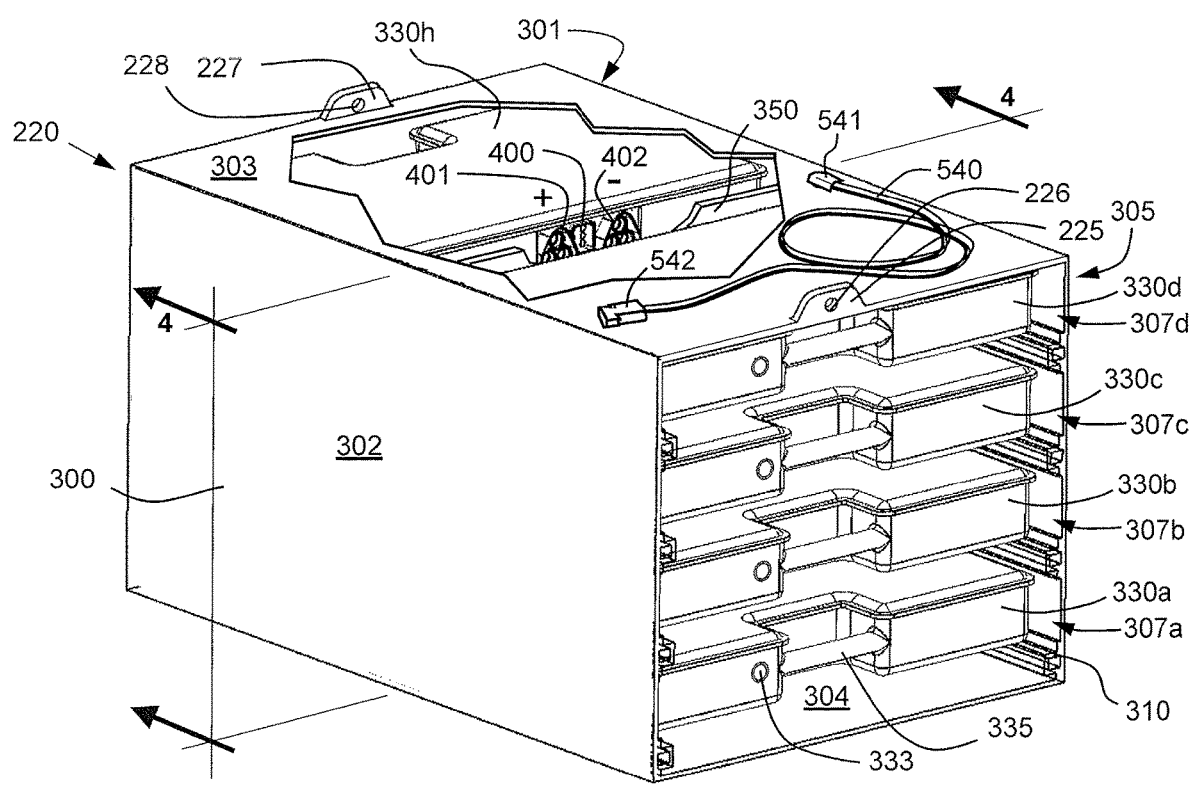

FIG. 21 is a middle cross-section view of the rechargeable battery assembly 220 of an alternative embodiment, showing the outer housing rack 300 and the other half of the battery modules 330 (i.e., the half not shown in FIG. 21, namely modules 330e-330h) operatively positioned therein, with the viewing plane of FIG. 21 being numbered as the cross-sectional plane 4-4 in FIG. 22.

FIG. 22 is a partially-cut-away isometric perspective view of the rechargeable battery assembly 220 of an alternative embodiment with its battery modules 330 operatively positioned therein, with a large portion of the top wall 303 and part of central wall 350 partially cut-away in order to reveal some of its detail.

Figure 23A:
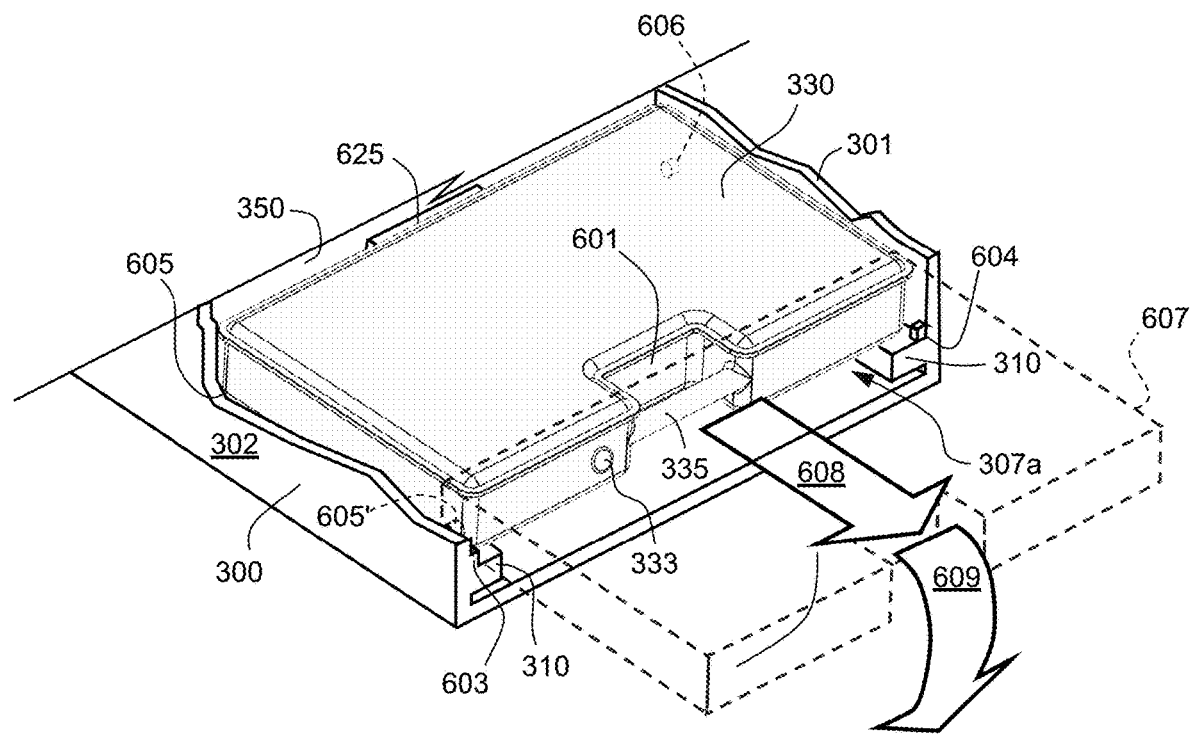

FIG. 23A is a partial isometric perspective view focusing on one of the individual battery modules 330 (namely, module 330a) of an alternative embodiment in its operatively engaged position within bay 307a of housing rack 300, with most of that housing being cut-away to show the module 330a and its removability in the direction of arrows 608 and 609.

Figure 23B:
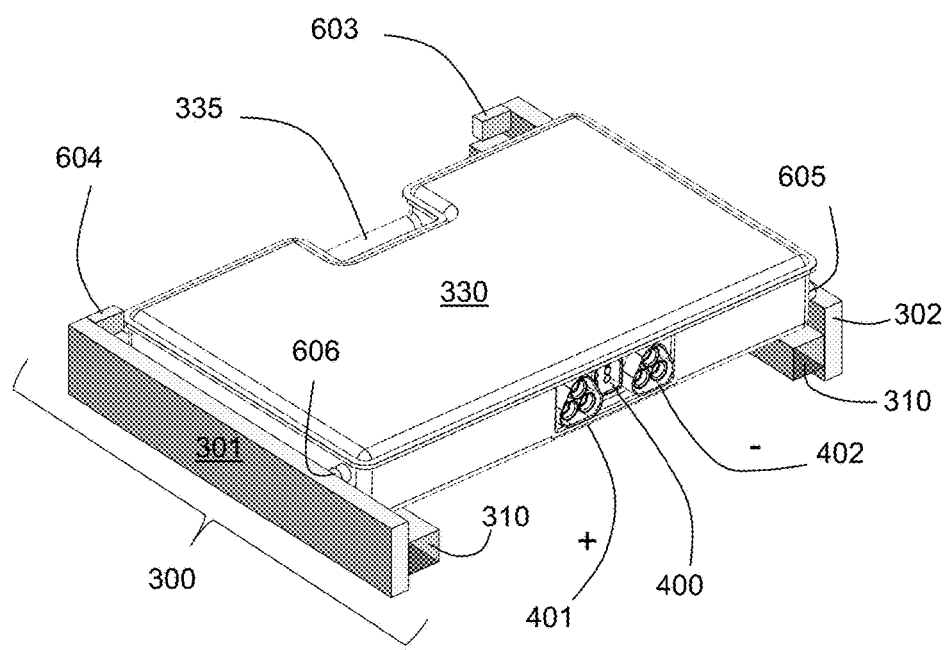

FIG. 23B is a simpler isometric view showing the rear of an individual battery module 330a of an alternative embodiment resting on elemental representations of slides 610 and 611 of the housing rack assembly 300.

FIG. 24A is an isometric view of the top of the interior of a battery module 330 of an alternative embodiment and its rear connections 400, 401 and 402.

FIG. 24B is an isometric view of the bottom of the interior of the battery module 330 of the alternative embodiment of FIG. 24A, and its rear connections 400, 401 and 402.

Figure 25:
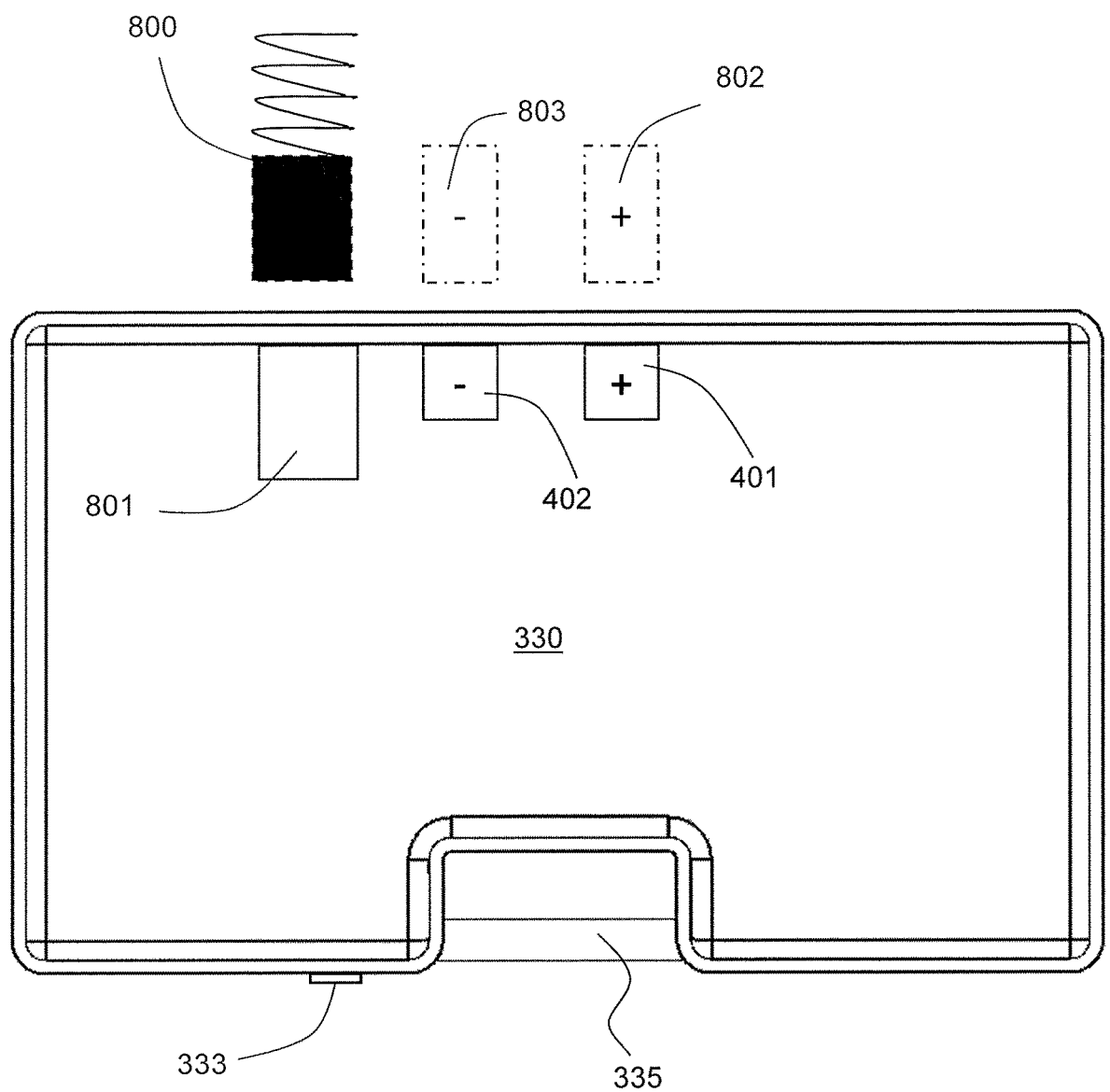

FIG. 25 is an elemental top view of a battery module 330 of an alternative embodiment showing symbolic representations of its connections and mechanisms for operative installation and removal in and from the housing rack 300 of FIG. 23.

Figure 26:
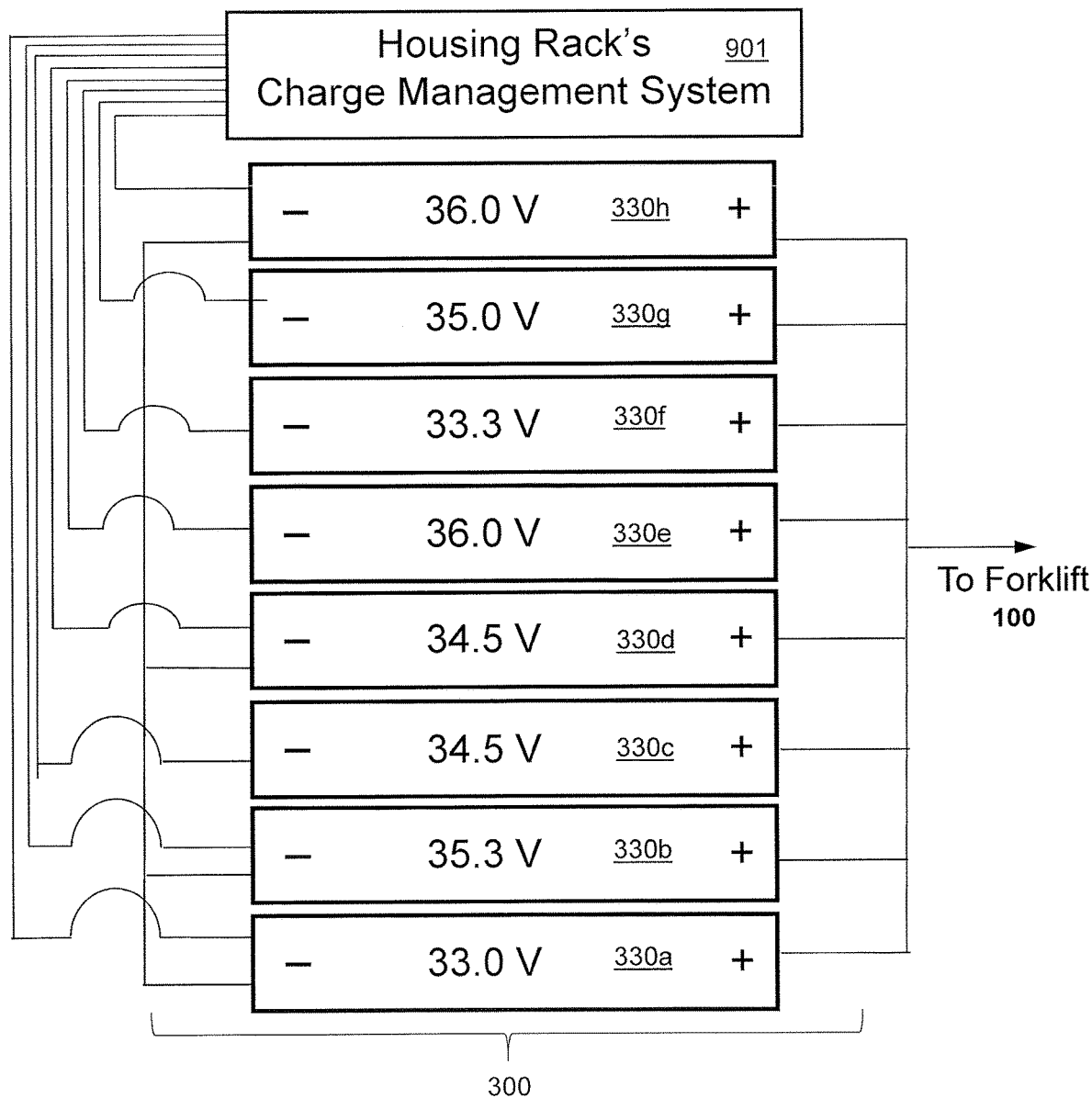

FIG. 26 is a schematic diagram example of an alternative embodiment with the battery modules in the housing rack connected in parallel and connected to a housing rack control system 901.

DETAILED DESCRIPTIONS OF PREFERRED EMBODIMENTS

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

Preferred Embodiments

The following descriptions relate principally to preferred embodiments while a few alternative embodiments may also be referenced on occasion, although it should be understood that many other alternative embodiments would also fall within the scope of the invention. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should also appreciate that many changes can be made relative to the disclosed embodiments while still obtaining a comparable function or result without departing from the spirit and scope of the invention.

Housing Rack and Battery Module Interface Design

Figure 1:
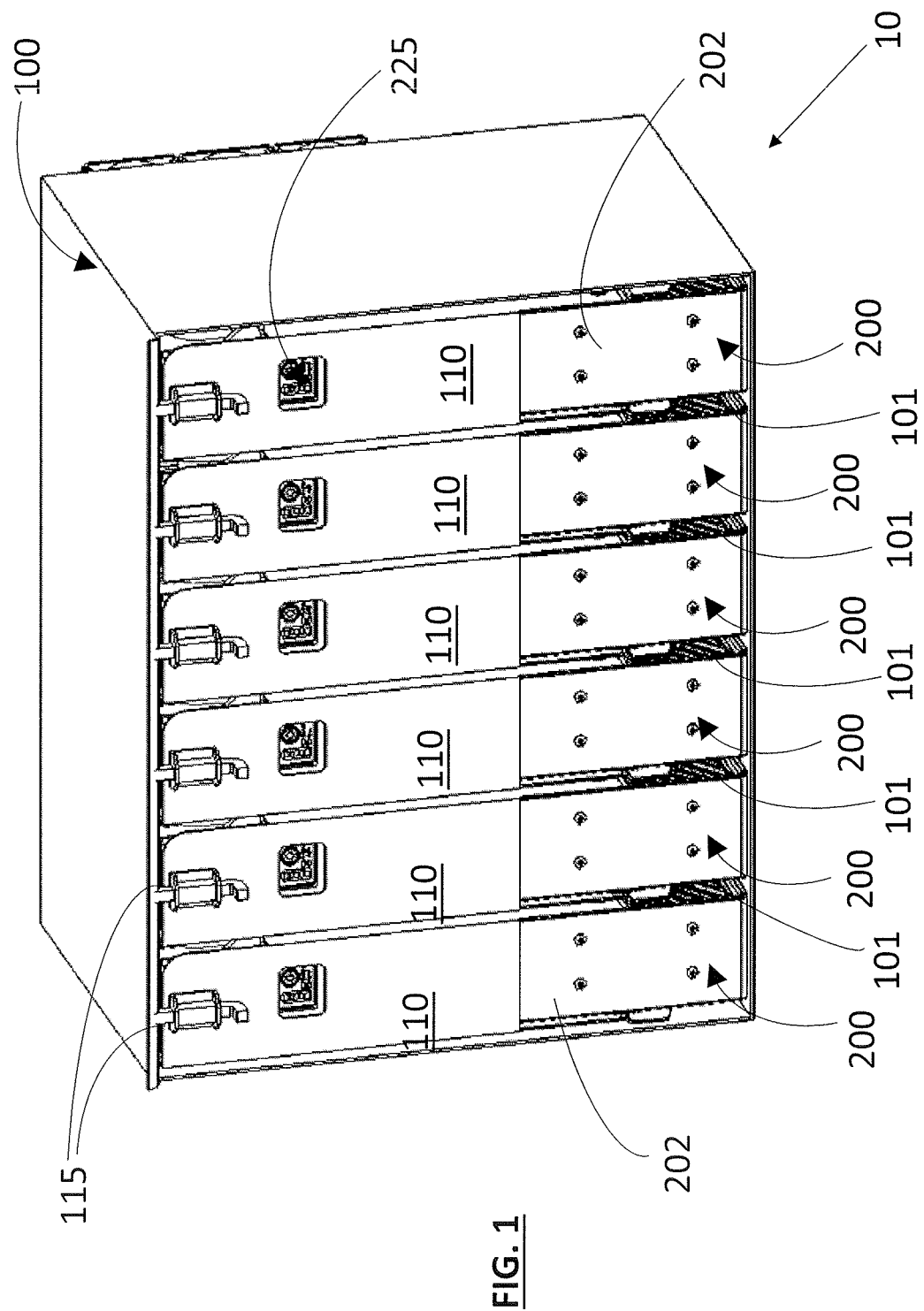

In FIG. 1, there is shown a perspective view of a preferred embodiment 10, showing the front of the housing rack ("housing") 100. Housing 100 is preferably constructed of steel or another material suitable for providing strength and stability. A preferred embodiment 10 has six battery modules ("modules") 200 arranged vertically. When installed in housing 100, each module 200 is secured in place by doors 110 with slam latches 115. Slam latches 115 are attached to the front of each door 110. The doors 110 prevent the modules 200 from sliding back and forth and preventing the contacts from becoming loose. Each door 110 extends from the top of housing 100 to the exposed bottom sheath 202 of module 200. Additionally, partitions 101 are fixed to housing 100 and located between each module 200 to prevent side to side movement. There are a total of five partitions 101 fixed to housing 100. Each of the doors 110 is hollowed out so that the display panels 225 on each module 200 are visible. The display panels 225 are lit up using LEDs and indicate the status of each module 200. Further details regarding the display panels 225 are shown in FIG. 15 and described later in the specification.

Representative Lift Truck

FIG. 2 shows a side view of a conventional Class I electric forklift 130, which is representative of a prior art lift truck design with which and in which the present invention may be incorporated, embodied or used. The particular model of forklift 130 illustrated is most like a Caterpillar model E6000 forklift, which specifies a 48V battery that is 34.4 inches long (i.e., depth from front to rear)×39.5 inches wide (i.e., the lateral dimension when installed on the forklift)×23.3 inches in height and that meets minimum weight requirements. As a Class I forklift, forklift 130 is a mobile truck with a lifting assembly 131 for raising and lowering forks or other load supporting members 132 that are adapted to support a load 150 thereon, for the purpose of lifting, carrying or moving that load 150.

While the load supporting members 132 are conventionally designed to support the load 150 in a cantilevered fashion, extending forward of a fulcrum generally created by the front wheels 142 of the forklift 130, heavier loads present risks of tipping over the forklift 130. Hence, minimizing that risk of tipping under load is basic to safe operation of such a forklift 130 and, in line with its classification as a Class I lift truck, the full range of weight ($F_L$, illustrated by arrow 151) of the loads 150 to be carried by forklift 130 must be properly counterbalanced by a counterweight force ($F_C$, illustrated by arrow 121). In other words, for safe lifting and maneuvering of a load 150 without tipping, the forward-tipping torque created principally by the weight ($F_L$, illustrated by arrow 151) of that load 150 must be exceeded by the opposing torque created principally by the counterweight force ($F_C$) of the forklift 130, particularly for loads at the heavier end of the range of manufacturer specified load capacities for forklift 130.

In the prior art, such a forklift 130 generally includes a large lead acid battery 160 as a major part of the counterweight force ($F_C$), and Class I forklifts are generally designed accordingly. The design of such forklifts generally incorporates structure to safely support the weight of the forklift battery 160 within a battery compartment 122 of a particular length (i.e., depth), width and height. The battery compartment 122 is generally defined in part by removable or openable panels or the like that partially or completely contain and define the space for the forklift battery 160 therein. In the case of the illustrated forklift 130, for instance, the battery compartment 122 is defined in part by a seat assembly 135 and a partial side panel 136. The seat assembly 135 normally sits over the top of the forklift battery 160 but has a releasable latch that allows it to be manually pivoted up and away from the forklift battery 160 to enable an operator to access the forklift battery 160 or its compartment 122. Analogously, panel 136 or other structures are provided to help enclose and define the battery compartment 122, and panel 136 may also be either removable or openable to enable more complete access to that battery compartment 122, such as for purposes of checking or replacing the forklift battery 160 therein. Forklift 130 also has positive and negative electrical conductors for removably connecting the forklift's electrical circuitry to the corresponding terminals of the conventional forklift battery 160.

The forklift uses a fulcrum (illustrated by arrow 91) which is created between the forklift's front wheels and the underlying floor 90. If the moment created by the load force ($F_L$) of load 150 forward of that fulcrum 91 exceeds the opposite moment of the forklift counterweight ($F_C$), the forklift 130 will tip forward, toward the load 150, resulting in a dangerous situation. The location of the center of gravity 161 depends partly on if the forklift is loaded or unloaded. When the forks 132 are raised while carrying a load 150, the center of gravity 161 naturally shifts toward the front of the forklift and upward.

Rechargeable Lithium-Ion Battery Assembly

FIG. 3 shows the same representative Class I electric forklift 130 as illustrated in FIG. 2, but having a preferred rechargeable battery assembly 230 according to the teachings of the present invention operatively installed in the battery compartment 122, in place of the conventional lead acid forklift battery 160 of FIG. 2. In contrast to the conventional lead-acid battery 160, rechargeable assembly 230 includes a plurality of separable battery modules 200, preferably an even number of such modules 200 (six in the illustrated embodiment), each of which includes numerous lightweight lithium-ion battery cells therein. Most preferably, those numerous battery cells are of the LFP type. Even without recharging or replacing individual modules 200, the entire assembly 230 can hold an operable charge for around ten hours before requiring approximately 60 minutes to recharge, in contrast to the shorter usage durations and much longer charging durations that are characteristic of conventional lead acid battery 160. Also, due to their lithium-ion chemistry, each module 200 can be cycled through about six times as many charging cycles as conventional lead-acid battery 160.

For LFP chemistries in particular, charge rates corresponding to one hour or less charge times are often within the recommended operating limits of the cell. Additionally, the ease of removal of modules 200 allows for opportunity charging during work breaks. For example, an operator can remove a module 200 during a 15 minute break and get a substantial recharge during this short interval. The longer run times of rechargeable assembly 230 compared to conventional lead-acid batteries 160 also improves workplace efficiency. For lead-acid batteries 160, large areas are allocated for recharging. After an 8-hour work shift ends, lead-acid battery 160 is removed for recharging and another charged lead-acid battery 160 is inserted. Replacing this system with rechargeable assembly 230 can save time and valuable space in the work environment.

Another important advantage of rechargeable assembly 230 is the lower equivalent series resistance (ESR) in LFP batteries than lead-acid batteries 160. Lead-acid batteries 160 experience decreased performance as a result of having higher ESR. Often as these batteries 160 discharge, a "voltage droop" occurs, causing sluggish operation of the forklift truck under load or acceleration. Most often, this occurs around 6 hours into a shift, requiring an additional recharge per shift, whereby reducing the life of the battery. LFP batteries provide an improvement in sustained performance during shifts while significantly reducing the risk of voltage droop.

The preferred embodiment of rechargeable assembly 230 has six battery modules 200 installed in a larger housing rack 100. Those modules 200 are preferably arranged in two symmetrical groupings, half being removable from one lateral side of the housing rack 100, and the other half being removable from the other lateral side of that housing rack 100. The complete assembly 230 preferably contains two sets of six modules 200 arranged back-to-back and vertically oriented, the front faces of which are exposed on one side or the other of the forklift when any detachable panels 136 are removed or opened. Alternative embodiments may have a different location or different quantities of battery modules making up the housing rack 100.

Sized, weighted and otherwise adapted to be roughly comparable to the conventional battery 160, the height "H", depth "D" and width (the dimension perpendicular to FIG. 2) of assembly 230 are substantially the same as those for the conventional forklift battery 160 intended for use with forklift 130. Hence, assembly 230 may be described as "forklift-battery-sized". Due to its forklift-battery-sized characteristic, for the forklift 130 as illustrated, assembly 230 is able to safely fit in the same battery compartment 122 as conventional battery 160. The preferred embodiment of rechargeable battery assembly 230 is also weighted with centrally-oriented steel plates in its base, integrally secured to its lower surface 304, to meet the minimum (and maximum) weight requirements of batteries to be used in forklift 130, as specified by the manufacturer of forklift 130.

Hence, for use on the Class I electric forklift 130 shown in FIG. 3, lithium-ion battery assembly 230 is adapted to fit in a Caterpillar E6000 forklift battery compartment 122, for use as a replacement of conventional lead-acid battery 160. More specifically, for the E6000, lithium-ion battery assembly 230 roughly fits the dimensions of 34.4 inches long (i.e., depth from front to rear)×39.5 inches wide (i.e., the lateral dimension when installed on the forklift 130)×23.3 inches in height, and assembly 230 has a minimum weight of 3100 pounds, preferably with a margin of fifty pounds over the manufacturer's specified minimum battery weight requirement.

Those of skill in the art will understand that the dimensions, fit, shape and weight for different makes and models of forklifts will dictate a range of dimensions for alternative embodiments that are intended to be used with any particular make and model of forklift. The full range of sizes for Class I forklift batteries are intended for alternative embodiments. The range of minimum battery weight requirements for Class I electric forklifts are approximately 1,500 to 4,000 lbs., which is also intended for alternative embodiments.

It is contemplated that the preferred embodiment allows for the removal of four modules 200 on each housing rack 100 for replacement or recharge, while still being able to maintain operation of the forklift with two modules per rack 100. To accommodate continued operation despite removal of one module 200, such removal will not decrease the voltage below the requirement for the forklift 130.

Although many aspects of the present invention can be appreciated with other types of rechargeable batteries, preferred embodiments use battery cells of one of the lithium-ion types. Most preferably, each module 200 of the battery assembly 230 incorporates hundreds of self-contained battery cells of the LFP (lithium iron phosphate) type. Although all lithium-ion battery types can experience thermal runaway, LFP battery cells of the preferred embodiment have a fairly high thermal runaway temperature, of 270 C, substantially higher than the runaway temperature for NCA or other LCO cells, which are the more conventional of lithium-ion battery cells, which typically have a thermal runaway temperature of around 150° C. Although the preferred embodiment uses LFP batteries, it should be understood that some aspects of the invention can be appreciated through use of other types of rechargeable lithium-ion battery cells. For example, alternative compounds for some aspects of the invention are contemplated to include, without limitation, lithium cobalt oxide ($LiCoO_2$), lithium manganese oxide ($LiMn_2O_4$, $Li_2MnO_3$), lithium nickel cobalt aluminum oxide ($LiNiCoAlO_2$), and lithium nickel manganese cobalt oxide ($LiNiMnCoO_2$).

Within each of the battery modules 200 of the preferred embodiment, a plurality of self-contained battery cells (preferably somewhere in the range from one-hundred, sixty to two-hundred cells per module 200) is connected in a combination of series and parallel using a wire bonding method. The wire bonding method connects batteries using wire bonds instead of busbars. The wire bonding is achieved through ultrasonic friction welding. By interconnecting batteries with wire bonding, the wire bonds can prevent short circuits while acting as fuses. The wire bonds are made of wire that allows for the expected current to pass through without significant overheating and allows the wire bond to break to prevent over-currents of individual cells. Additionally, FET's or other forms of conventional fuses are placed inside battery modules. If the current carrying capacity is exceeded, the fuse will open and prevent the overcurrent from also blowing out the wire bonds. Alternative embodiments of this design may connect battery cells in parallel. Additionally, alternative methods of connecting batteries could include traditional soldering and spot welding.

Removal and Insertion of Battery Modules

Figure 4B:
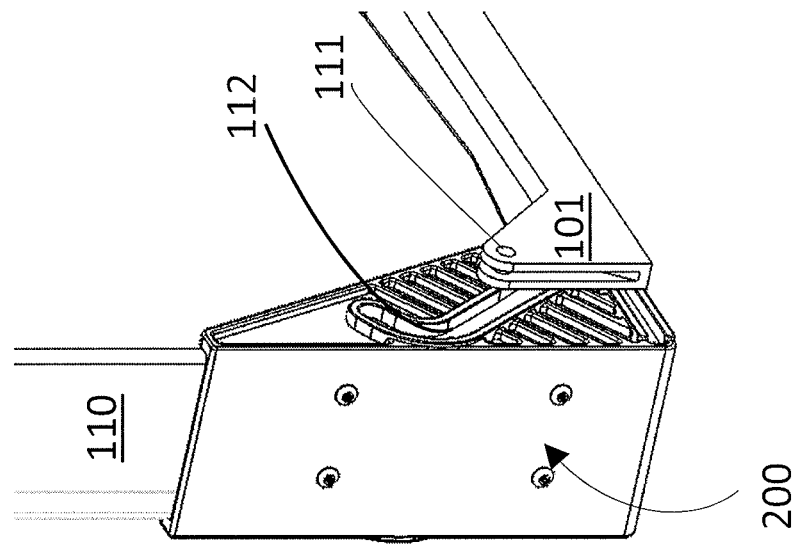
FIG. 4B shows the pin locking feature of the door which holds the battery module in place.
Figure 4A:
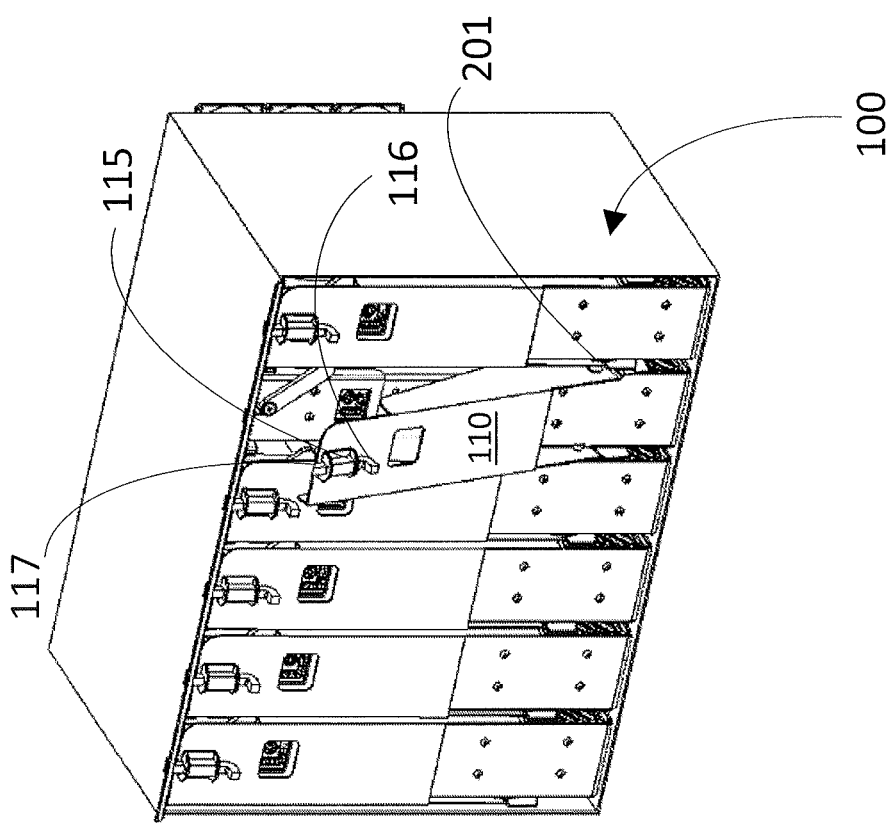
FIG. 4A shows the disengagement of a slam latch from the housing.

Turning to FIG. 4A, there is shown a disengagement of a slam latch 115 from the housing 100. The bottom end 116 of latch 115 is pushed down in order to release the top end 117 from the engagement with housing 100. Pin 201 is permanently attached to door 110 and fits into the groove 112. In FIG. 4B, there is shown a hinge 111 of door 110 that engages module 200. Though not visible in FIG. 4B, door 110 has an identical pin 201 on its opposite side. Similarly, module 200 has an identical groove 112 on its opposite side. Pins 201 remain at the top of grooves 112 until the door 110 is opened.

Turning to FIG. 5A, there is shown a door 110 of housing 100 in a halfway open position. It is shown in FIG. 5A that module 200 is protruding from the front edge 102 of housing 100. In FIG. 5B, the pin 201 is shown halfway up the groove 112. When the door 110 is opened, it rotates counterclockwise on hinge 111. Simultaneously, pin 201 moves down groove 112 toward the bottom of module 200. It should be understood that the same mechanism occurs at the same time on the opposite side of module 200. As the door 110 is opened, the module 200 begins to slide out of the housing 100.

Figure 6B:
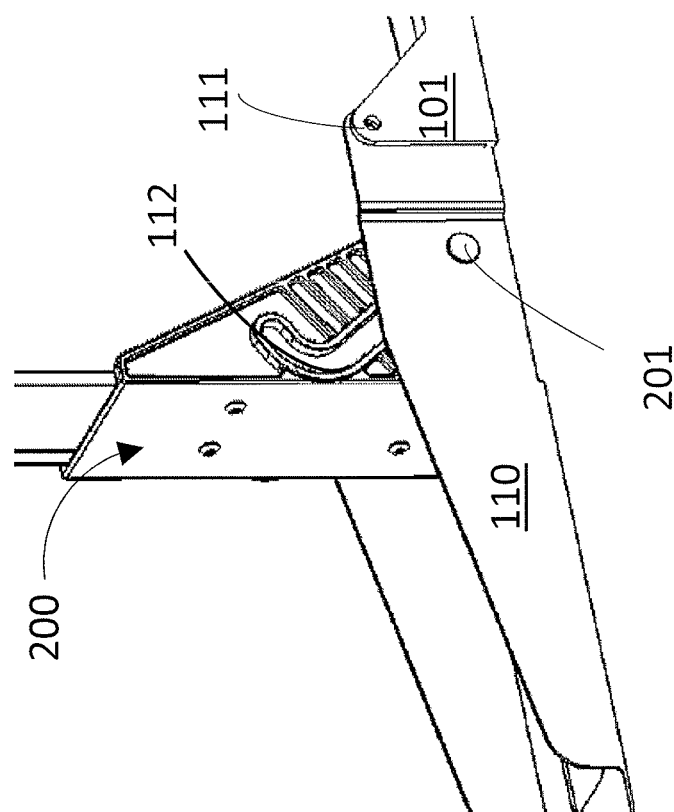
FIGS. 6A and 6B show a door of housing in a fully open position and the location of the door pin.
Figure 6A:
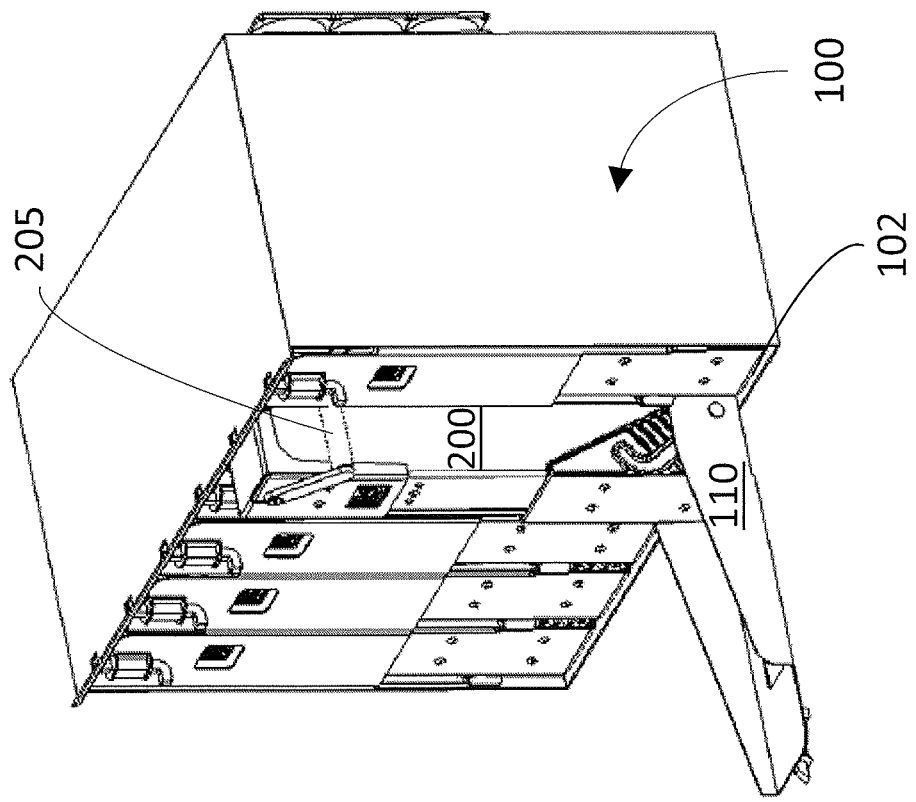

Turning to FIG. 6A, there is shown a door 110 of housing 100 in a fully open position, rotated 90 degrees from the closed position. As a result of opening door 110, module 200 is pulled out of housing 100 and protrudes from the edge 102. The carry handle 205 of module 200 is clearly visible in FIG. 6A. Carry handle 205 is preferably bolted to module 200 and can be detached. In FIG. 6B, the pin 201 is shown at the bottom of groove 112, enabling module 200 to be removed from housing 100.

Figure 7B:
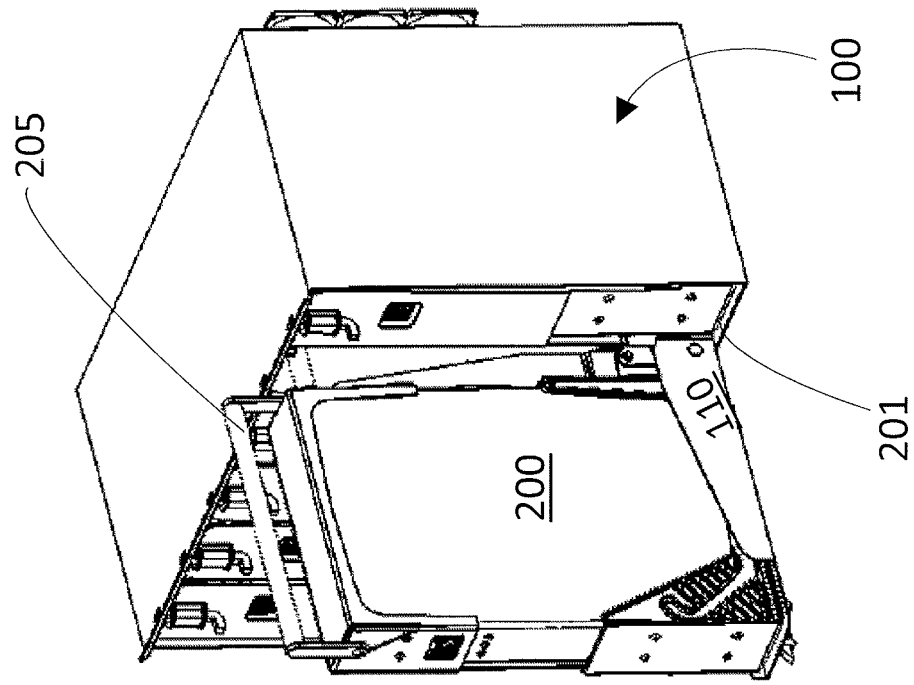
FIGS. 7A and 7B show the removal process for the module from the housing once the door is fully opened.
Figure 7A:
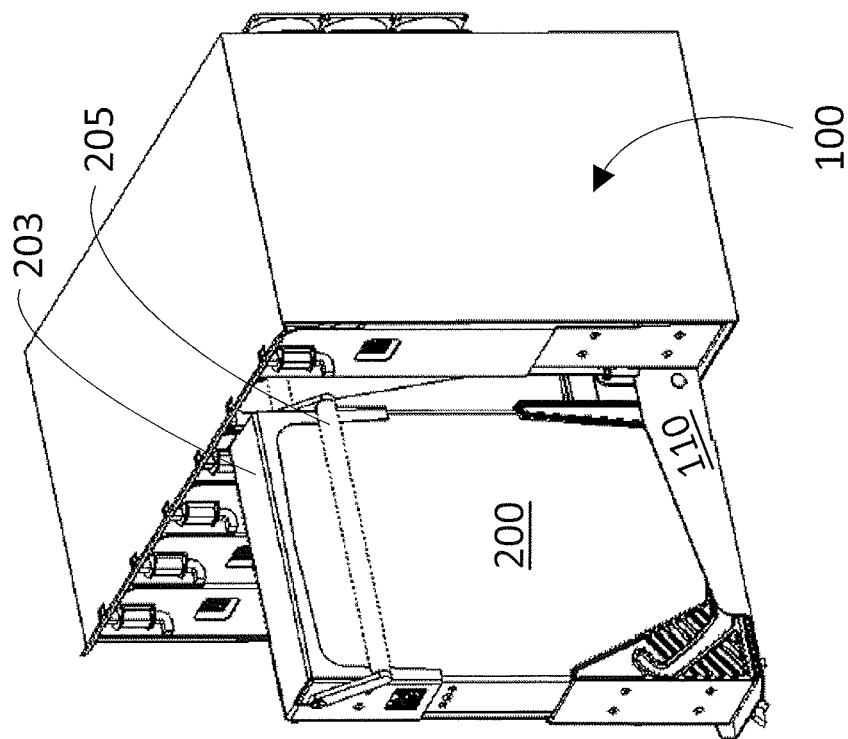

Turning to FIG. 7A, there is shown module 200 removed from housing 100 and resting on door 110. At the top of module 200, there is a protective top sheath 203 with a hollowed out area for viewing display panel 225. Once the door 110 is in the fully open position, a user can manually slide module 200 along tracks (not shown) out of housing 100 and onto door 110. The preferred embodiment 10 has low friction slides located below each module 200. Turning to FIG. 7B, the user can manually fold the carry handle 205 upward and lift module 200 off of the door 110. The user can carry module 200 using carry handle 205 to a battery charging station and replace it with another charged module 200. Preferably, the battery modules 200 weigh no more than 51 pounds in compliance with OSHA and other workplace standards. Replacing a module 200 requires performing the opposite actions of the aforementioned removal procedure.

Figure 8B:
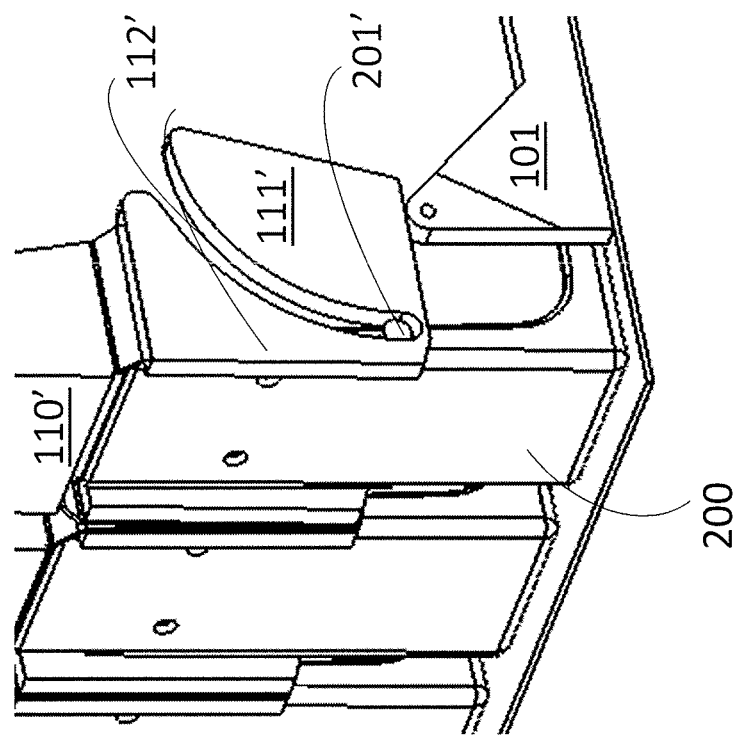
FIGS. 8A and 8B show the disengagement of a slam latch from the housing for an alternative embodiment.
Figure 8A:
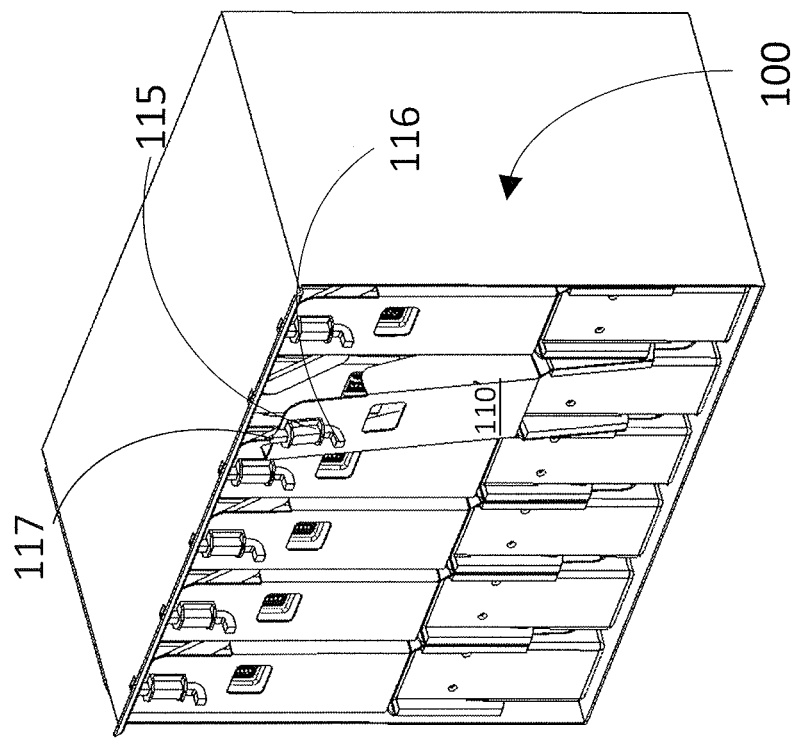

FIGS. 8A-11B show the procedure for removal of module 200 in an alternative embodiment. Turning to FIG. 8A, there is shown a disengagement of a slam latch 115 from the housing 100. The bottom end 116 of latch 115 is pushed down in order to release the top end 117 from the engagement with housing 100. In FIG. 8B, there is shown a hinge 111' of door 110' that engages module 200. A pin 201' that is permanently attached to module 200 fits into the groove 112' in hinge 111'. The pin 201' remains at the bottom of hinge 111' until the door 110' is opened.

Figure 9B:
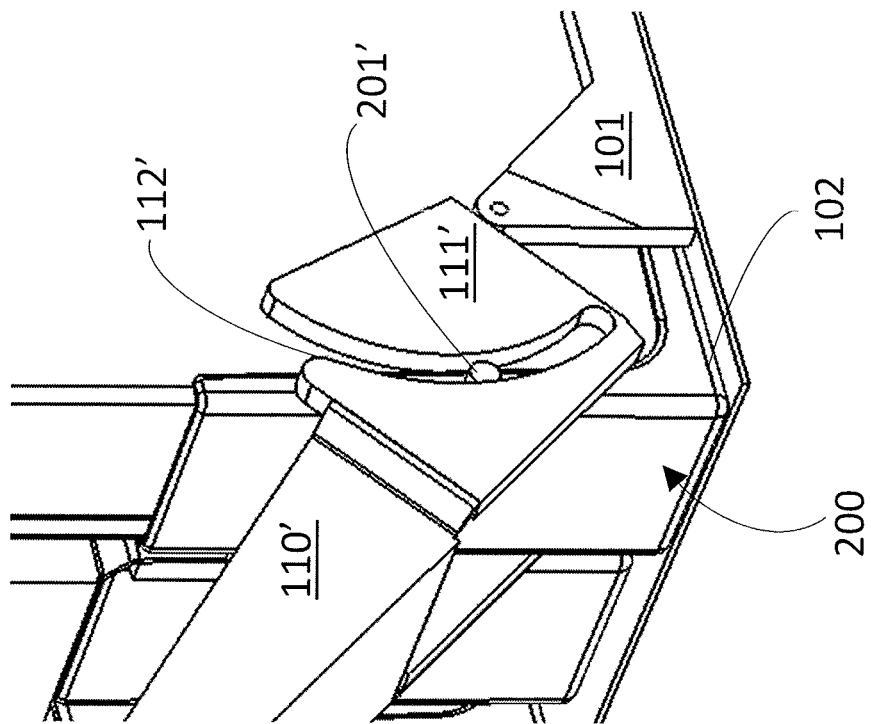
FIGS. 9A and 9B show a door of housing in a halfway open position and the location of the module pin.
Figure 9A:
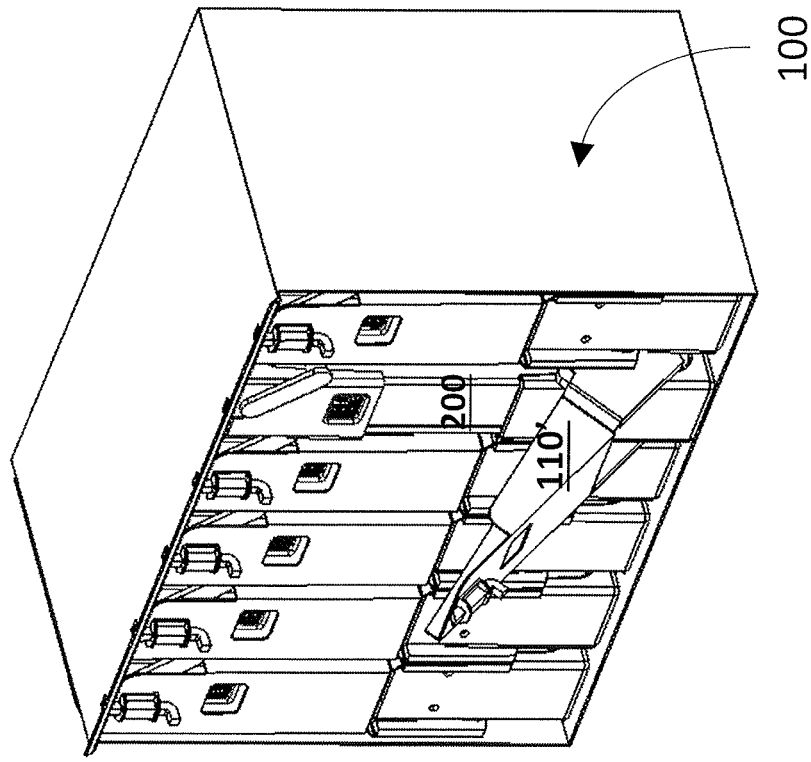
Figure 10B:
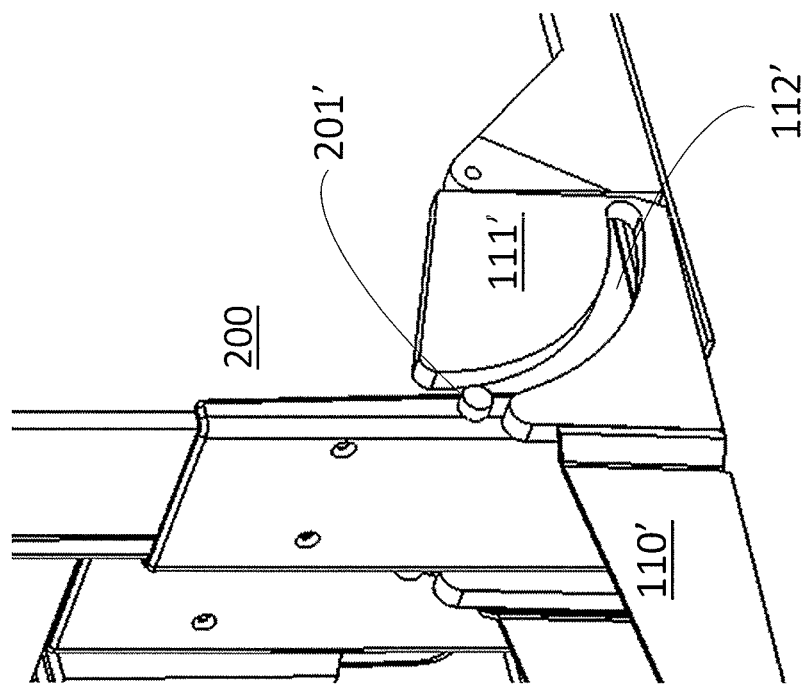
FIGS. 10A and 10B show a door of housing in a fully open position and the location of the module pin.
Figure 10A:
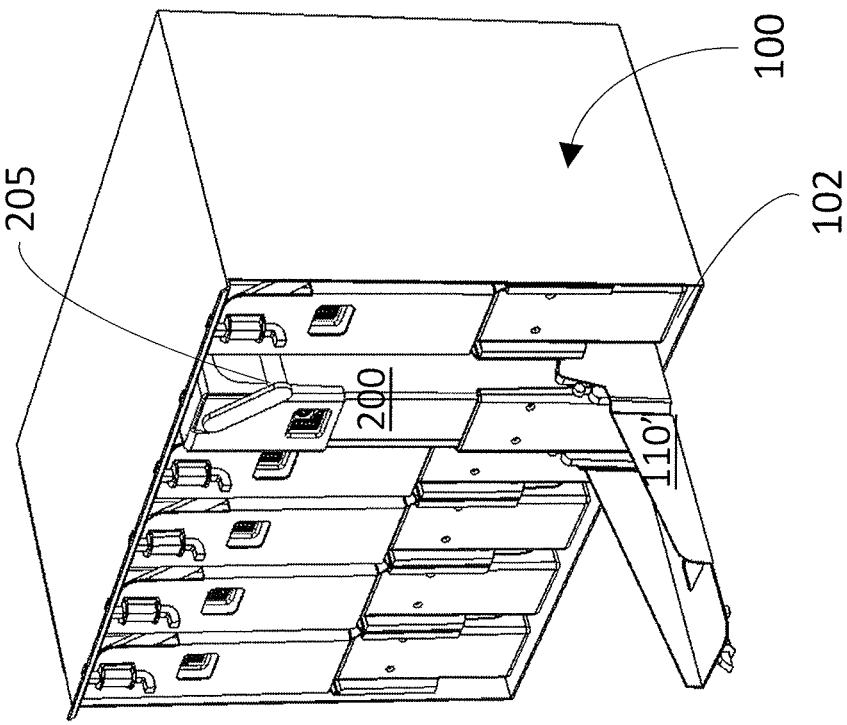
Figure 11B:
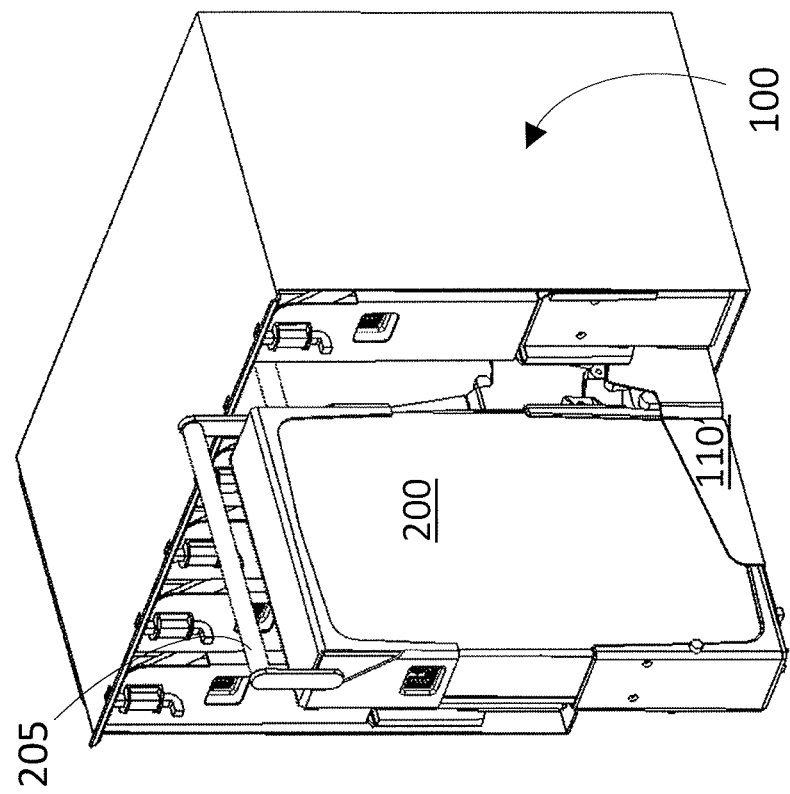
FIGS. 11A and 11B show the removal process for the module from the housing once the door is fully opened.
Figure 11A:
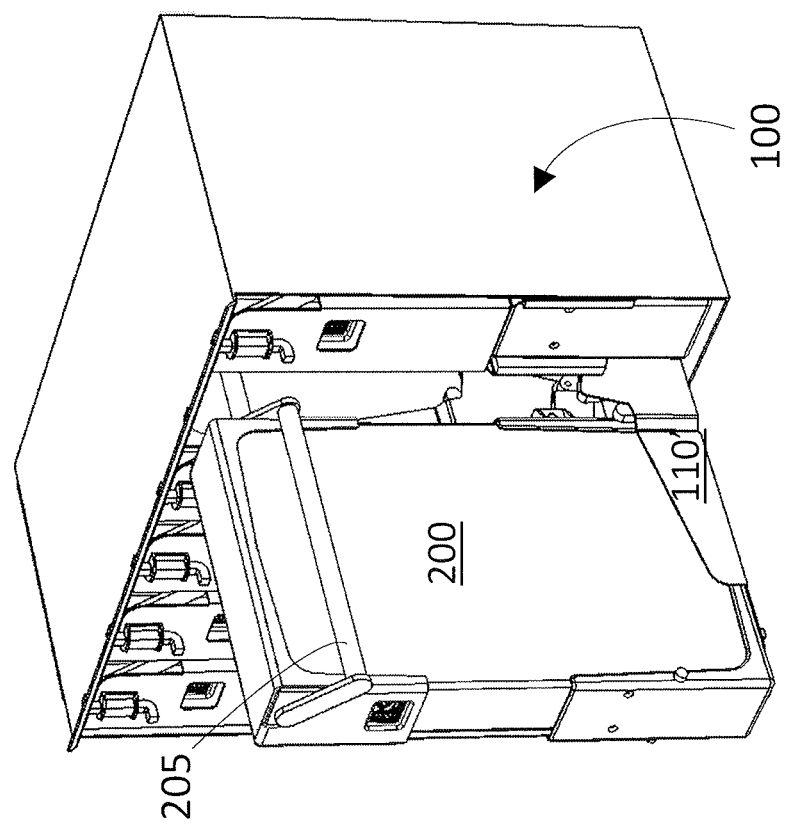

Turning to FIG. 9A, there is shown a door 110' of housing 100 in a halfway open position. In FIG. 9B, the pin 201' is shown halfway up the groove 112'. When the door 110' is opened, the hinge 111' rotates counterclockwise around the fixed pin 201'. As the door 110' is opened, the module 200 begins to slide out of the housing 100. At this time, an electric switch (not shown) is actuated. The interlock pin 911 (shown schematically in FIG. 19) loops through the physical latch (not shown) in the slot where module 200c connects. When module 200c is inserted and the latch closes, the interlock pin 911 is shorted with module ground pin 914. It is shown in FIG. 9B that module 200 is protruding from the front edge 102 of housing 100. Turning to FIG. 10A, there is shown a door 110' of housing 100 in a fully open position. As a result of opening door 110', module 200 is pulled out of housing 100 and protrudes from the edge 102. The carry handle 205 of module 200 is clearly visible in FIG. 10A. Carry handle 205 is preferably bolted to module 200 and can be detached. In FIG. 10B, the hinge 111' is shown rotated 90 degrees counterclockwise from the closed position. The pin 201' is outside groove 112', enabling module 200 to be removed from housing 100. Turning to FIG. 11A, there is shown module 200 removed from housing 100 and resting on door 110'. Once the door 110' is in the fully open position, a user can manually slide module 200 along tracks (not shown) out of housing 100 and onto door 110'. The embodiment has low friction slides located below each module 200. Turning to FIG. 11B, the user can manually fold the carry handle 205 upward and lift module 200 off of the door 110'. The user can carry module 200 using carry handle 205 to a charging station and replace it with another charged module 200. Replacing a module 200 requires performing the opposite actions of the aforementioned removal procedure.

Figure 12:
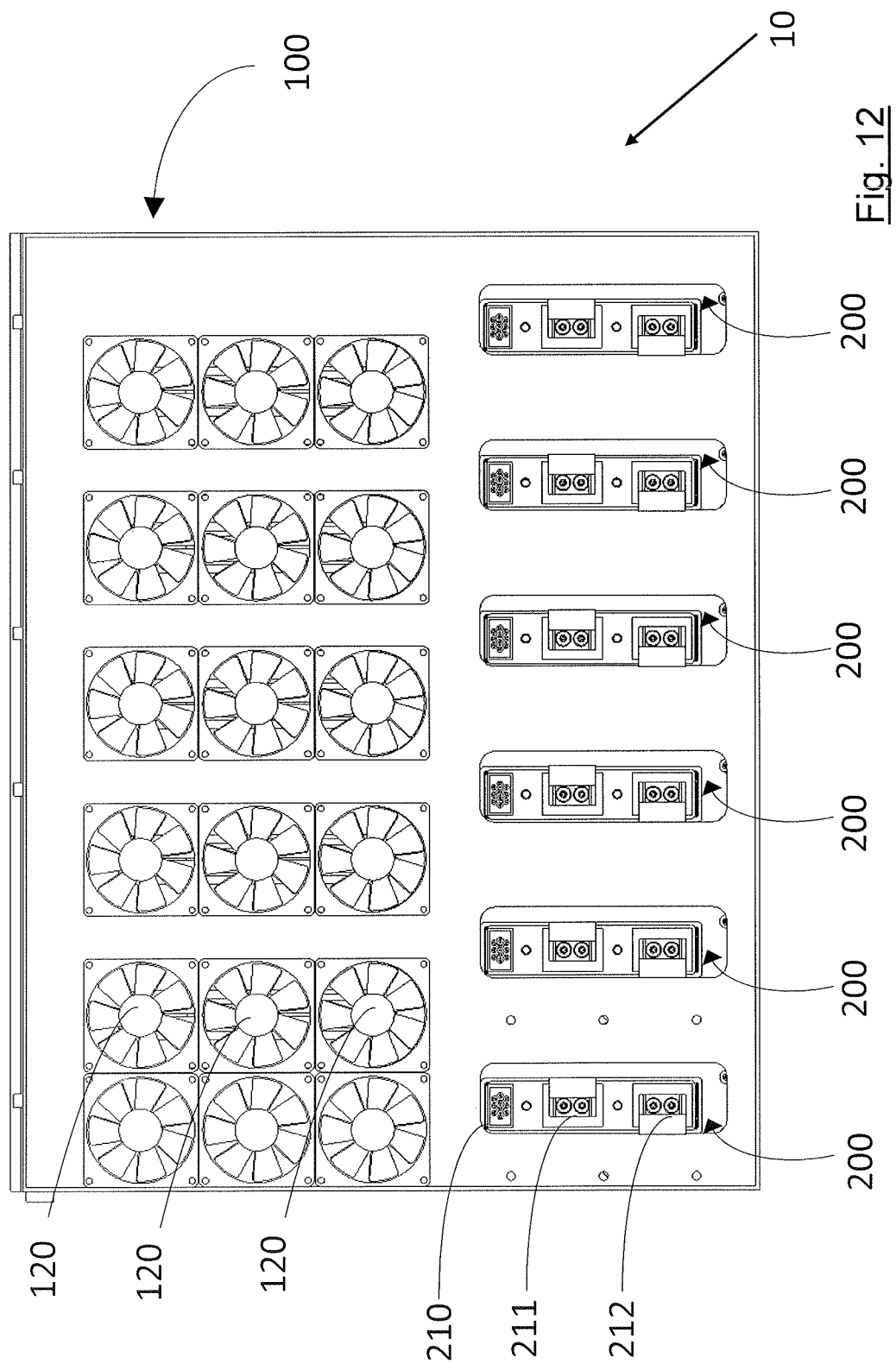
FIG. 12 shows a rear view of the housing with the modules inserted.

Turning to FIG. 12, there is shown a rear view of housing 100. There are six sets of fans 120 for cooling the modules 200. Each set has three fans 120 and the sets are located between modules 200. For example, the first set shown on the left of FIG. 12 is located between the first and second modules 200. The second set is located between the second and third modules 200, the third set between the third and fourth modules 200, the fourth set between the fourth and fifth modules 200, and the fifth set between the fifth and sixth modules 200. The sixth set of fans is located between the sixth module 200 and the housing 100 wall. Different numbers of fans are also contemplated by the inventor for the purpose of providing module cooling. Six sections of the housing 100 are hollowed out so that the rear side connections of modules 200 are exposed. At the rear of each module, the 10-pin signal connector 210 and positive 211 and negative 212 connectors are visible.

Figure 13:
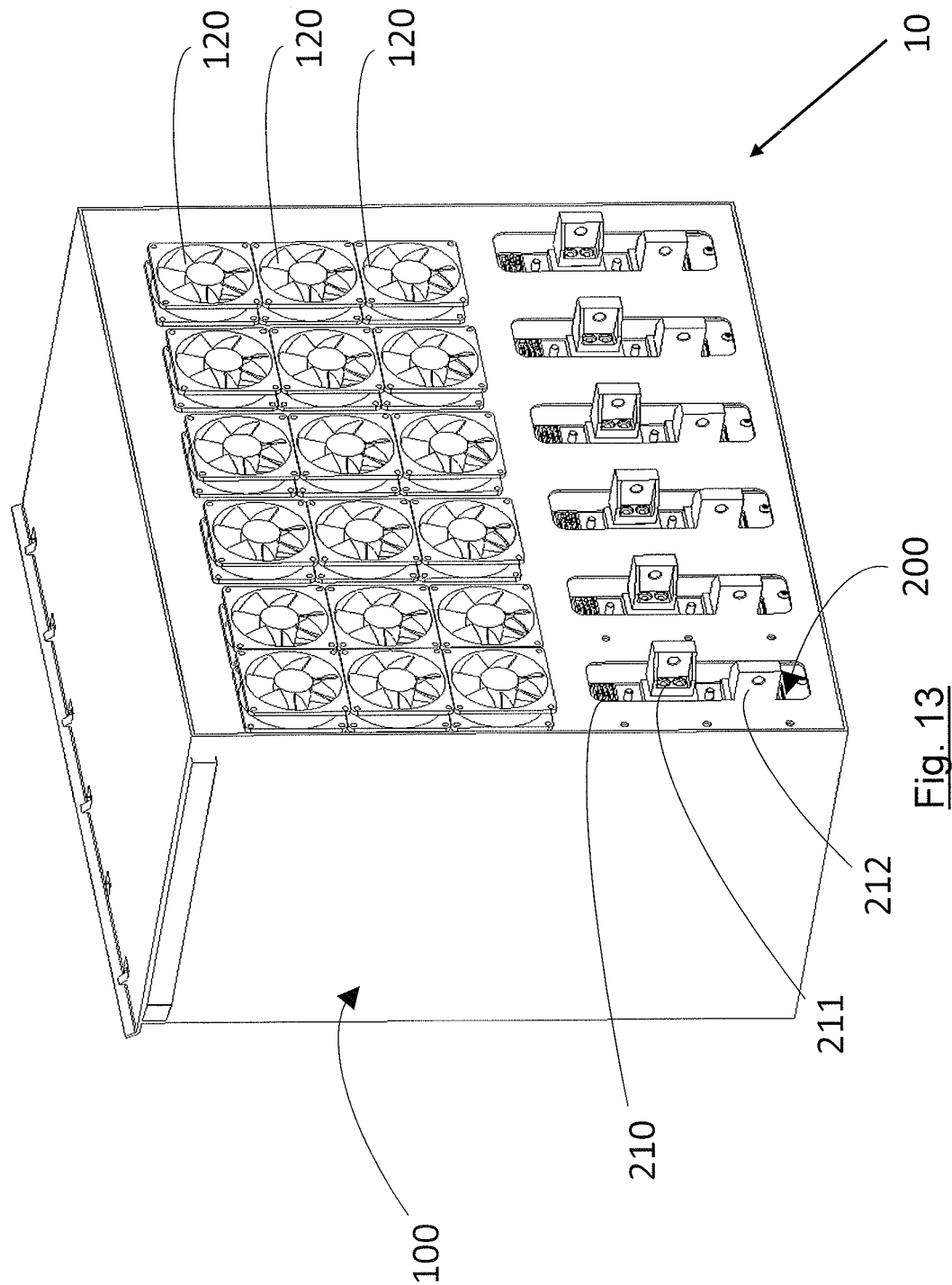
FIG. 13 shows a perspective view of the rear and sides of the housing with the modules inserted.

Turning to FIG. 13, there is shown a perspective view of a preferred embodiment 10, showing the back of housing 100. From this view, it is clearly shown that the positive 211 and negative 212 battery terminals protrude from the back surface of housing 100. It is important to understand the purpose of having these connections 211, 212 protrude while signal connector 210 is recessed. It is necessary to make sure the high current battery terminals 211, 212 are mated before the battery module 200 is "enabled" during the insertion process. "Enablement" occurs when the 10-pin signal connector 210 goes through a series of interlocks with the bus (not shown). If the module 200 is "enabled" before it is physically connected to the bus and the bus voltage and battery voltage differ, then at the moment the terminals 211, 212 mate, there will be instantaneous high current to equalize the potentials. The purpose of the mechanism is to ensure the high current connector is mated before enabling the battery module 200 and disabling the battery module 200 before it is disconnected for safety, notably to prevent arcing which can damage electrical connectors.

For these reasons, the signal connector 210 is the last connector to mate during module 200 insertion and the first connector to disengage during module 200 removal. This method requires the pins in the 10-pin connector 210 to be substantially shorter than the battery terminals 211, 212, so that during the removal process, the 10-pin connector will disconnect while the battery terminals 211, 212 are still connected. At this point in the process, the module 200 will detect that it is no longer connected to housing 100 via the 10-pin connector 210, and shut itself off instantaneously before the battery terminals 211, 212 are disconnected.

Figure 14:
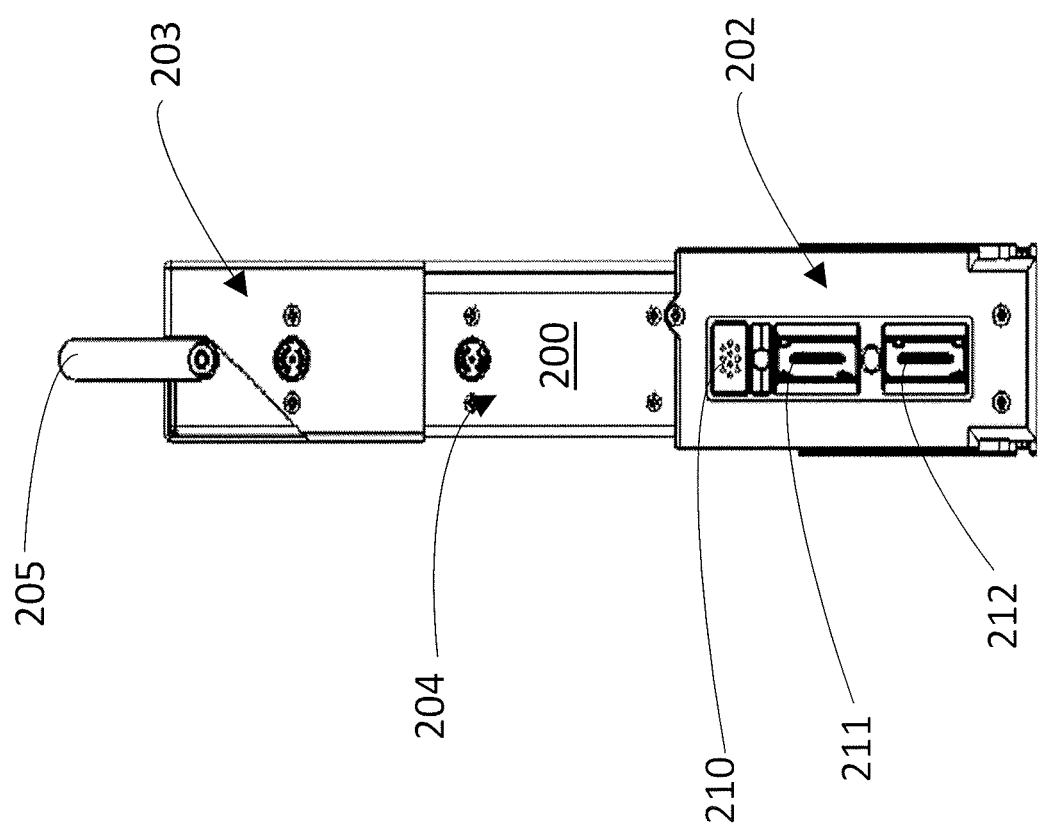
FIG. 14 shows a rear view of a battery module.

Turning to FIG. 14, there is shown a rear view of battery module 200. The protective case 204 of battery module 200 is preferably constructed of aluminum or another lightweight material with similar properties. The bottom sheath 202 is hollowed out for the 10-pin connector 210 and battery terminals 211, 212. Each module 200 has a microcontroller and is able to connect to a CAN bus using its 10-pin connector 210.

Turning to FIG. 15, there is shown a sectional front view of battery module 200. The top sheath 203 is hollowed out for the display panel 225 and the carry handle 205. Display panel 225 is illuminated using LEDs and has a button 221 with a status bar 222 and a fault bar 223. A user can press button 221 to "wake" the display from sleep mode. A coded push can be used for diagnostics. If the status bar 222 lights up blue, the module 200 is operating normally. If the fault bar 223 lights up red, there is a fault with module 200. There are five bars 224 that light up green and indicate the battery charge level of module 200. The five bars 224 will show charge status in increments of 20% of charge ranging from 0%, to 100% based on the number of LEDs illuminated. For example, one bar indicates that the charge is very low (around 20%) and five bars indicates the module 200 is fully charged (100%).

Electrical Design of Battery Cell Network and Battery Module

Figure 16:
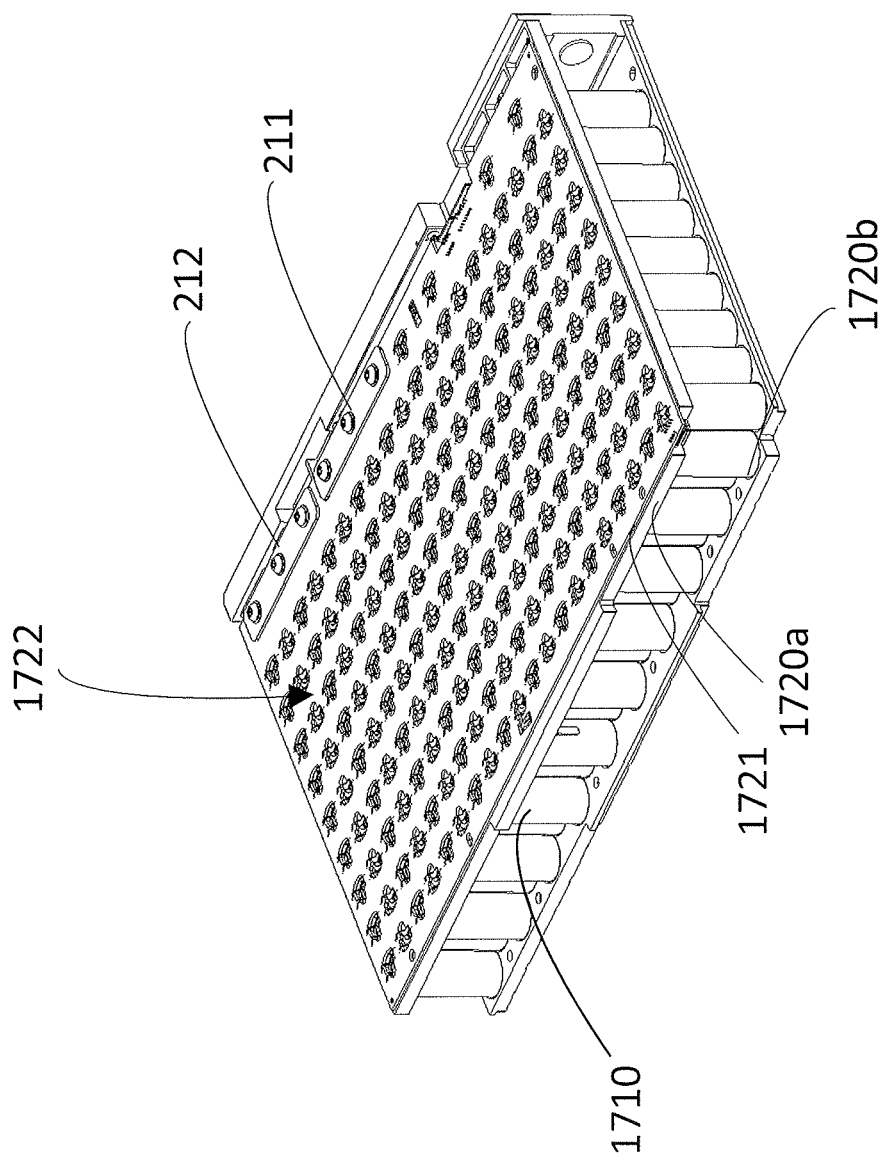
FIG. 16 shows a perspective view of the interior of a battery module.

Turning to FIG. 16, there is shown a perspective view of the interior of module 200. Each battery cell 1710 is wire bonded to a printed circuit board (PCB) 1722. Located between the battery cells 1710 and the PCB 1722 is a top plastic battery tray 1720a and a thermally conductive glue 1721 or other adhesive Plastic battery trays 1720a, 1720b are placed directly on top of and below the battery cells 1710. The thermally conductive glue 1721 is used between battery trays 1720a, 1720b and the PCB 1722. The thermally conductive glue 1721 is also an electrical insulator.

Figure 17:
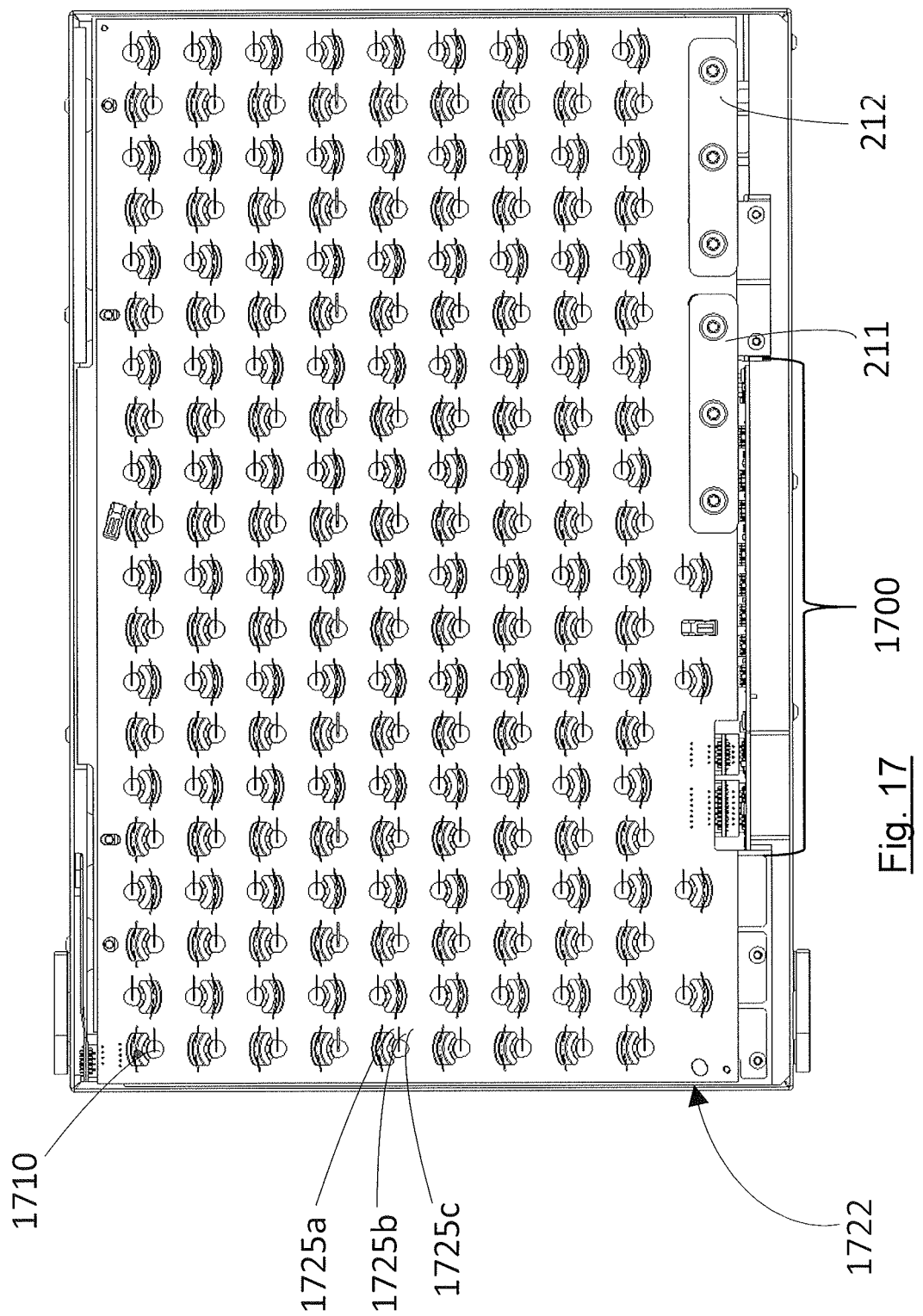
FIG. 17 shows a top interior view of a battery module.

Turning to FIG. 17, there is shown a top interior view of module 200. Each battery cell 1710 is wire bonded to a printed circuit board (PCB) 1722. There are three wires 1725a, 1725b, 1725c bonded to pads on the PCB 1722 for each battery cell 1710. Two of the wires 1725a, 1725b are negative and one of the wires 1725c is positive. The purpose of two negative wires is for redundancy. The preferred embodiment contains 184 LFP battery cells. The battery cells 1710 can be divided into groups of 23 cells called "banks." The BSS can monitor voltage, temperature, and state of charge for banks but cannot monitor individual battery cells 1710. Alternate embodiments may contain variations of the arrangement or numbers of battery cells 1710.

Figure 18:
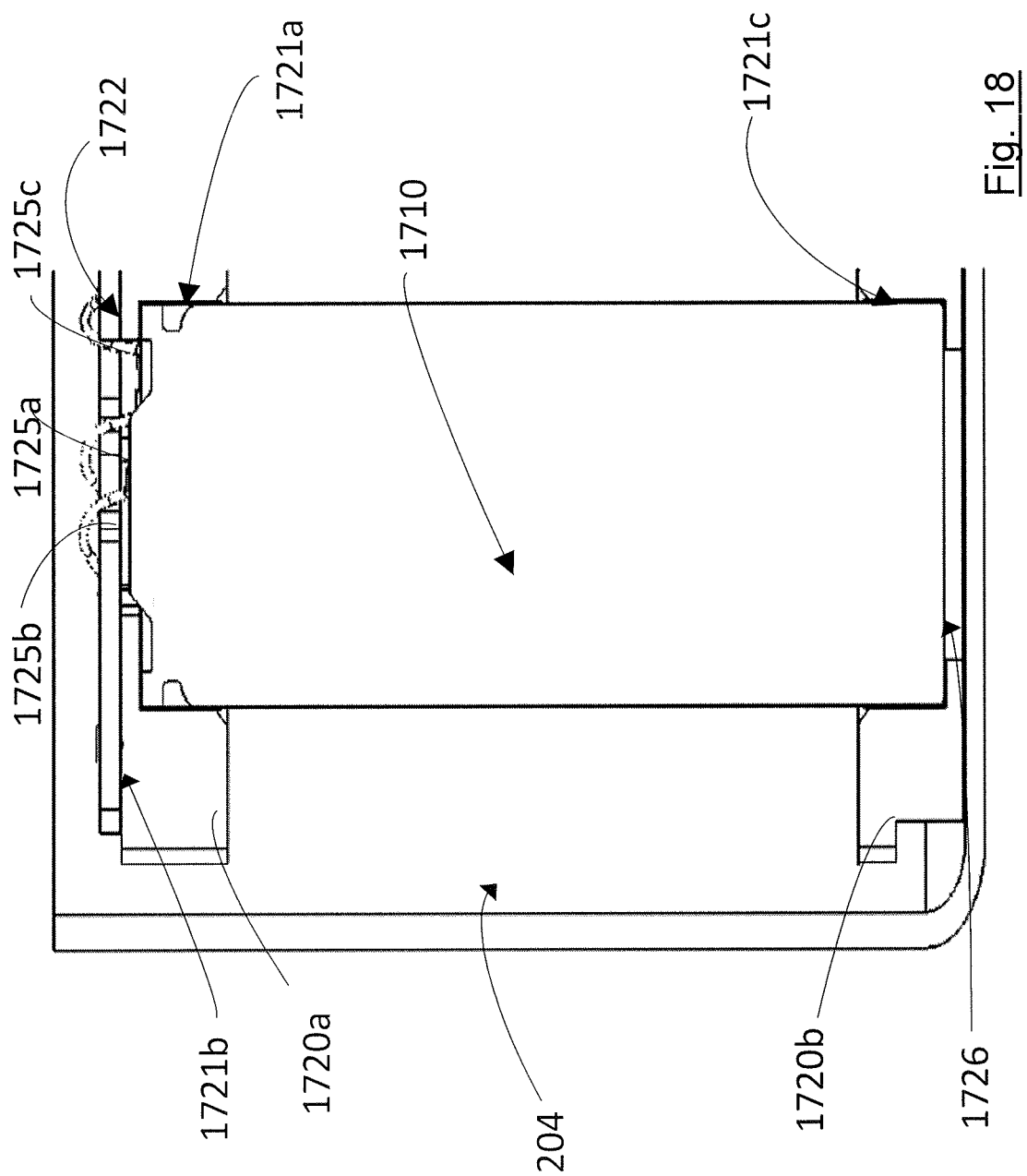
FIG. 18 shows a cross sectional view of an individual battery cell within a module.

Turning to FIG. 18, there is shown a cross sectional view of a single battery cell 1710. As previously mentioned, the battery cells 1710 and other components are surrounded by a protective enclosure 204, preferably constructed of aluminum. Directly above battery cell 1710, there is a plastic battery tray 1720a. The thermally conductive adhesive 1721a is used between the top of battery cell 1710 and top battery tray 1720a. Similarly, the same thermally conductive adhesive 1721b is applied between the top battery tray 1720a and the PCB 1722. It is clearly shown that positive wire 1725c and two negative wires 1725a, 1725b are wire bonded to the top of PCB 1722. Turning to the bottom of FIG. 18, the thermally conductive adhesive 1721c is applied between the bottom of battery cell 1710 and bottom battery tray 1720b. Furthermore, a thermally gap filling material 1726 is used between the bottom of battery cell 1710 and the bottom of protective enclosure 204. The gap filling material 1726 allows heat to be transferred from the battery cells to the enclosure 204 so it can dissipate from the module 200.

Turning back to FIG. 17, each module 200 has an integrated battery supervisor system (BSS). The BSS 1700 monitors the health to include cell voltage, current, and temperature. Each module 200 is composed of a plurality of battery cells 1710 connected in series and parallel via wire bonding and ultimately terminating into an integrated BSS 1700. The wire bonding will be completed using a method similar to the Tesla ultrasonic friction welding method. The holes shown are used to wire bond the battery cells 1710 to the PCB 1722. In each hole, tiny wires 1725a, 1725b, 1725c will be bonded to both the PCB 1722 and the battery cell 1710. The PCB 1722 is then used to directly transfer the electric current through the interior of the battery module 200. The use of the PCB 1722 prevents the entire battery module 200 from failing if one battery cell 1710 malfunctions because the other cells are still connected to the plate.

The preferred embodiment of the BSS 1700 uses real-time battery cell information and compares this information to a set of reference values. It uses this comparison to determine abnormalities in individual battery cells and in the plurality of cells to diagnose the problem. The diagnostic information can be transmitted externally using a communication unit. The BSS 1700 will also use this real-time data to prevent any issues during the battery operation by disconnecting the battery from the housing rack 100 electronically if it senses a problem.

During charging, the BSS 1700 monitors the depth of discharge for each bank of 23 cells, compensates for voltage temperature differences, and ensures battery banks are properly balanced. If one battery cell has slightly more or slightly less capacity than the rest of the batteries, then its level of discharge will deviate from the other batteries over several charge and discharge cycles. The BSS 1700 must balance the batteries to prevent over-discharge as well as over-charge, which causes damage and eventually complete battery module failure and can present a safety risk.

Charge Management Systems Integration

Figure 19:
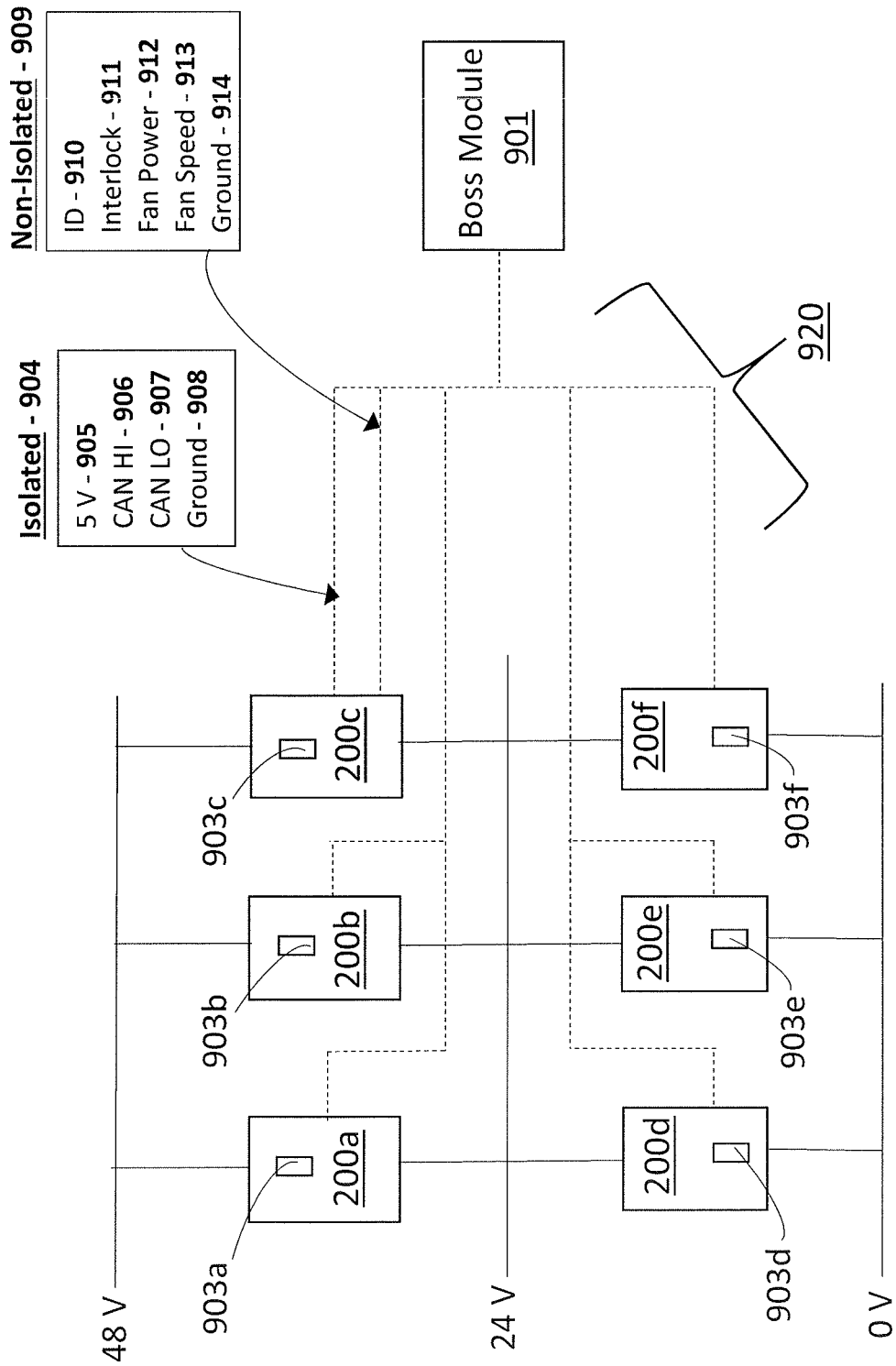
FIG. 19 shows a schematic diagram where the six battery modules are connected in parallel to the housing rack.

FIG. 19 is a schematic diagram where the six battery modules 200a-f are connected in parallel to the housing rack 100. At any particular point in time, each battery module 200 may have a different state of charge, particularly as the module charges are drained through use in powering the forklift. The "state of charge" is defined as the percentage charge the module 200 currently has. Each module 200 may be at a different initial voltage due to differences in battery life or initial charge levels. Each module 200 may also have a different max voltage when they are "fully charged," considering differences in age and usage of particular modules 200. For example, module 200a may have a voltage of 24.0 V when fully charged while module 200f may have a voltage of 23.9 V when fully charged.

It is necessary for a Battery Operating System Supervisor (BOSS) module processor ("BOSS module") 901 to serve as a battery management system for the modules 200a-f. But for the control of BOSS module 901, in such scenarios where the voltage in one module exceeds the others, the lower voltage battery modules would draw a current flow from the higher voltage modules into the lower voltage modules that would be only limited by resistance of the connectors, cells, bus bars, and bond wires. A large difference in voltage would cause high current flow to the battery module with lower voltage. These situations are undesirable because the current flow to the motor is reduced as current flows between battery modules, rather than out of the housing 100. If a high current is maintained for an extended period of time, or the voltage discrepancy is high enough such as to produce a current higher than the handling capability of the bond wires, it can also lead to battery failure by draining the battery rapidly or opening the bond wires.

Turning back to FIG. 19, there are a total of three bus bars which the modules 200 connect to. The negative terminals 212 of the modules 200 will either connect to the 0 V (ground) bus bar or the 24 V bus bar, depending on the grouping. Half of the modules 200 negative terminals 212 will connect to the 0 V bus bar and the other half will connect to the 24 V bus bar. The positive terminals 211 of the modules 200 will connect to the 48 V bus bar. As previously described, the Boss module 901 grants permissions to battery modules 200 to determine which are connected to the bus bars and which modules 200 are disconnected, by sending signals to the modules 200. Modules 200 then use MOSFET switches to connect and disconnect.

It should be understood that module 200c is used here only as an example and that each module 200 is wired and employed in the same manner. Communication between the BOSS module 901 and the modules 200 is best understood by describing the low voltage ten-pin connection 210, (actual connector 210 shown in FIG. 14) depicted schematically in FIG. 19. Four of the pins are "isolated" and five pins are "non-isolated," with one spare pin not currently utilized but may be employed later. The term "pin" is also used here when describing the wires corresponding to their respective pins in wire harnesses 904 and 909. The isolated pins are grouped as part of an isolated wire harness 904. It will be understood by those of ordinary skill in the art that "isolated" refers to galvanic isolation. Transformers are used to separate the isolated wire harness 904 from the main power supply. If an electrical short occurs in the isolated wire harness 904, there is no risk of damage to the rest of the circuits in the system. The isolated wire harness 904 is depicted as the upper dashed line connected to module 200c. Isolated wire harness 904 also connects to the vehicle bus 920. The vehicle bus 920 is the communication network depicted by the multiple dashed lines. When a module 200c is inserted into a "slot" in housing 100, the isolated 5 V pin 905 connects to it and signals the BOSS module 901. There are two pins for communication between module 200c and BOSS module 901; particularly, there is a CAN HI pin 906 and a CAN LO pin 907. Lastly, there is a ground 908 pin on isolated wire harness 904.

The non-isolated pins are grouped as part of a non-isolated wire harness 909. When module 200c is inserted in housing 100, the identification (ID) pin 910 connects to the BOSS module 901 in order to assign CAN addresses in the housing 100 (identify the slot position of the module 200c within housing 100). The interlock pin 911 loops through the physical latch (not shown) in the slot where module 200c connects so that the BOSS module knows that module 200c is connected. There is also a pin 912 for controlling fan power, a pin 913 for controlling fan speed, and a module ground pin 914. Battery module 200c (and all battery modules) is responsible for controlling its own fan speed and fan power. When module 200c is inserted and the latch closes, the interlock pin 911 is shorted with module ground pin 914. Once this occurs, the BOSS module 901 can then grant permissions to module 200c to connect to the bus bars.

An example of the importance of BOSS module 901 can be understood during continuous operation of a forklift and replacement of modules 200. While the forklift is operating, the process of inserting a fully charged module 200 is known as "hot swapping." Looking at FIG. 19, module 200c is fully charged and was inserted while modules 200a-200f were already connected. BOSS module 901 will not grant permission for module 200c to immediately connect to the bus bars. Module 200c will wait until there is low demand on the other modules 200 before connecting to the bus bars. Low demand refers to a time when the forklift does not require a lot of current. For example, a forklift carrying a load and driving up a hill would require a lot of current. When the forklift is idle, the current demanded will be low and this would be an appropriate time for module 200c to connect. The BOSS module 901 does not control the disconnection and connection of modules 200 from the bus bars. BOSS module 901 only grants permissions to the modules 200 for the conditions when they are able to connect and disconnect. Each module 200 uses internal MOSFET switches 903a-f to rapidly open and close the circuit connections from the modules 200 to the bus bars. Once a fully charged module 200c is connected, a module 200 at a lower state of charge can disconnect. For example, if module 200f is at 60% and the other modules 200 are above 80%, module 200f will disconnect and only reconnect once the other states of charge decrease to about 60%.

For at least these reasons, BOSS module 901 in housing 100, to the extent networked, is designed to monitor the states of charge in each module 200 and will grant permission for a module 200 that varies by more than some threshold to disconnect. This allows the forklift to continue operating without hindering to performance. The specific 24 V battery modules are used in preferred embodiments, but alternative embodiments can use various voltages depending on the needs of the particular lift truck.

Another important feature of the system can be described in a case when there is an empty housing and the system is completely turned off. When the modules 200 are unplugged from housing rack 100, they automatically turn off. With an empty housing 100, when module 200a is inserted, the BOSS module 901 will not power on by itself. For this reason, preferred embodiment 10 has a continuously hot separate 5 V control connector 905. When module 200a is inserted, it connects to control connector 905 which powers up the BOSS module 901. This process occurs on a 5 V bus, separate from the vehicle bus 920. Since the current is so low on the 5 V bus, there is no risk of arcing. Although the aforementioned figures depict a housing rack 100 with one side, preferred embodiments will be two sided with six modules 200 on each side for a total of 12 modules 200. In the preferred embodiment, six battery modules 200 are connected in parallel in each housing 100 to attain a higher current capacity at a constant voltage. Alternative embodiments may employ any number of battery modules.

Alternative Embodiments

The following sections describe alternative embodiments of the disclosed system.

Lithium-Ion Battery Module System Design

FIG. 20 provides an elevation view of the rechargeable battery assembly 220 of the alternative embodiment, separate from forklift 130. The rechargeable battery assembly 220 has eight removable and interchangeable battery modules 330*a*-330*h*, which are operatively inserted in one of the eight identical module bays 307*a*-307*h* defined within an outer housing 300. The housing 300 makes up the outer surfaces of the larger battery assembly 220, and the overall height ("H", as labeled in FIG. 21), depth ("D", as also labeled in FIG. 3) and width (i.e., the dimension perpendicular to the sheet of FIG. 3; width not being labeled in FIG. 20) of the assembly 220 is about the same as the height, width and depth of lead acid batteries 160 (shown in FIG. 2) that are of a size suitable for intended use in forklift 130.

The alternative embodiment has the form of a unitary housing rack 300 with a capacity of receiving and managing eight removable battery modules 330, each of which is interchangeable with the others. FIG. 20 only shows four modules because the alternative embodiment has two symmetrical arrangements of four modules aligned back-to-back. This is so that the handles are exposed to the openings of the detachable panel 136 on the forklift 130 on both sides. This also simplifies the connection point in the housing rack to only one location. The housing rack 300 of serves multiple purposes and benefits. In addition to housing the battery modules 330 within the forklift 130, the rack can be removed, and used as a charging station, typically a floor-standing charging station. The housing rack 300 in the alternative embodiment is constructed of a metal. Particularly in preferred embodiments, housing rack 300 will be constructed of steel which provides durability. In addition to providing durability, having housing rack 300 constructed of steel adds weight that helps to prevent housing rack 300 from tipping when one or more battery modules 330 are removed, particularly when housing rack 300 is used as a charging station. Other materials are contemplated including, but not limited to, composites and polymers.

In addition to having dimensions that are forklift-battery-sized, as previously explained, the lowermost surface 304 of housing rack 300 is preferably weighted by the addition of a heavyweight material affixed thereto, preferably in the form of steel plates resting thereon but within the enclosure of housing 300. The added weight of those steel plates increases the weight of the overall assembly 220, so that it weighs more than the minimum battery weight specified by the manufacturer of forklift 130, while still enabling the lightweight characteristic of removable modules 330, which each weigh less than fifty-one pounds. It will be evident to those skilled in the art that this counterweight will consist of a heavyweight material, such as a high-density steel, and may be composed of multiple plates or sections to allow the user to manipulate the center of gravity 161 to maximize the safe lifting capabilities of the forklift. Alternate embodiments may include, but are not limited to, different locations of an adjustable counterweight, such as on top of the housing rack, or the multiple variations of the material of the housing rack and counterweight. The housing rack 300 may be designed in such a manner so that the rack itself can be replaced by a housing rack of different material to adjust the counterweight.

It is contemplated that the minimum battery weight requirements will be satisfied by a housing rack 300 and counterweight with less than a complete arrangement of battery modules 330. This is to allow for the user to still safely operate the forklift 130 in the event that there are not enough battery modules with enough charge. Alternative embodiments will be able to meet weight requirements with 6-7 modules. Other alternative embodiments will ideally meet minimum weight requirements with somewhere between 1 and 3 batteries 330 short of a complete arrangement.

Combined with the moderate weight of the housing rack 300, alternative embodiments weigh substantially less than a conventional lead-acid battery. Even in situations where the housing rack 300 has an incomplete arrangement of battery modules 330, the modules will still weigh less than 51 pounds. Each battery module 330 or "pack" is equipped a handle 335, at the rear of the module. The handle 335 will be designed to ensure easy gripping and for safe movement of the module. The design of the handle and functional method for removal and installation of the modules 330 will be discussed in more detail in subsequent sections.

Alternative embodiments include other adaptations to enable and ensure safe removal of both the battery modules and the housing rack 300 from the forklift 130. Preferably, there is a module release button 333 on the back of each battery module 330 that will ensure safe disengagement of the module 330 from the housing rack 300, safe release being considered from a mechanical perspective. Electrical disengagement will occur with an interlock pin configuration. This button will be described in more detail in the following section, "Housing Rack and Battery Module Interface Design." The front of the battery module will also have an indicator that will show if the battery is actively engaged or has been switched off. It will be evident to those skilled in the art that this indicator may take on a variety of alternate embodiments including, but not limited to, a small led indicator, a light that illuminates as a part of the button 333, or a LCD display panel on the front of the battery pack that also displays other indicators about the health of the battery. In this alternative embodiment, the LCD display panel will display indicators used to monitor battery health including but not limited to voltage, temperature, and remaining battery usage time.

FIG. 20 includes another important safety feature. There is an eyehook 226 located within a boss 225 at the top of the housing rack assembly 300. The alternative embodiment of the housing rack 300 will include eyehooks 226 at both ends of the housing rack for easy removal or installation of the rack into the forklift battery compartment. It will be evident to those skilled in the art that the structure of this boss 225 and eyehook 226 will mimic the existing eyehooks 125 and safe removal mechanisms currently used in the design of the conventional lead-acid battery 160 to ensure complete backwards compatibility. This may differ in shape from the representation in FIG. 21. Alternate embodiments may utilize different methods for the removal of the housing rack 300 from the forklift 130, but will be utilized so that the removal is conducted in a safe and convenient manner.

FIG. 21 shows a rear view of one half of the housing rack 300, so that the battery pack connection points are visible. The location of this viewing plane is shown as section 4-4 in FIG. 22. There is another eyehook 226 at the top of the rear of the housing rack 300. Located at the rear of the battery pack 330, the six-pin male connector 400 and the positive 401 and negative 402 battery terminals are the only wired connection points for engaging and disengaging the module. Within each module 330 is a plurality of lithium-ion battery cells. It will be understood by those of ordinary skill in the art that other connectors with various numbers of pins may be implemented. The outer casing of the battery module 330 is constructed of a hard, lightweight metal. Other materials are contemplated including, but not limited to, alloys, composites, and polymers.

FIG. 22 is an isometric view of the alternative embodiment of the housing rack 300. The alternative embodiment will have eight (four shown here) battery modules 330 arranged back-to-back in two stacks of four. When installed in housing 300, each module 330 sits on top of low friction slides 310 that allow for the smooth motion of the modules 330 into and out of the corresponding bay 307 in the housing 300 for assembly. Also, the features previously described on the module are included in this view. The front of each module has a handle 335 and the back has a button 333 for removal. The button on the rack will release the unit to be pulled from the rack. The pack will rely on a pin interlock (first to connect, last to break) to turn power on/off to the high current terminals. The latch is meant to keep the battery in place so that the contacts do not become loose. At the rear of each module the 6-pin connector 400 and positive 401 and negative 402 connectors are visible. Additionally, the eyehooks 226 and bosses 225 are visible at the front and rear of the housing rack 300.

Battery Module Design

FIGS. 23A and 23B are isometric views of the battery module 330 showing the individual battery module and the frictionless slides 310. FIG. 23A depicts the front of the alternative embodiment of the module 330 with both the disengagement button 333 and handle 335 visible. As previously mentioned, the handle 335 will be used to safely carry and remove the module 330. As clear from FIG. 23A, the alternative embodiment uses a handle bolted on behind the face of the module 330. It will be evident to those skilled in the art that the handle will be located to ensure easy lifting and gripping and relative dimensions and location may vary from those shown in FIG. 23A. The handle 335 is designed to carry the weight of the entire module.

The handle 335 allows the user to move the module 330 in the housing rack 300 in a fashion similar to a drawer and is constructed of a hard, lightweight metal. Other materials are contemplated including, but not limited to, alloys, composites, and polymers. Alternate embodiments are contemplated that could include a handle at the rear or handles on the side of the individual modules 330. Each of these handles will be fashioned in a manner to the battery module 330 to allow for the easy gripping and for safe movement of the module. It will be evident to those skilled in the art that handles added to module of the alternative embodiment may have hinges to lie flat with the surface, so that they will not interfere with the battery connection points or movement in and out of the battery rack 300.

FIG. 23B depicts the rear of the battery module. The six-pin connector 400 is wired directly to a BSS that is used to monitor battery health. Finally, the positive 401 and negative 402 terminals are connected to the same plurality of battery cells. The positive 401 and negative 402 terminals connect to the housing rack 300 through the use of a quick release connection. The requirements for this quick release connection are that they are able to: maintain performance through a high number of cycles, blindly connect the battery module 330 and the housing rack 300, and safely transfer current from the module 330 to the housing rack 300 through multiple contact points. The alternative embodiment makes use of a spring biased connection that allows each battery terminal 401 and 402 to slide into the corresponding socket when the battery module 330 is connected. Other alternative embodiments may make use of a similar quick connections that allow for blind sliding connecting and disconnecting.

Due to the nature of utilizing multiple battery modules 330 in a larger housing rack 300, the removal and installation of modules into the rack is an important aspect of this design. The alternative embodiment has low friction slides 310 located below each battery pack. Alternative embodiments may use other methods to achieve this sliding motion to position the modules 330 in the housing rack 300, such as the use of rollers or ball bearings to facilitate removal and installation.

In such an alternative embodiment, the module 330 slides on cylindrical rollers with roller bearings and is guided by a track on each side of the module, in the same location as the frictionless slide 310. The rollers and roller bearings would be constructed of lightweight metal in the embodiment. Alternative embodiments may employ various types of roller bearings and rollers constructed of different materials besides metal. It is contemplated that every embodiment of the design will include some method to prevent the module from moving uncontrollably out of the assembly.

It is contemplated that the alternative embodiment of battery module removal will accomplish two things: have a mechanism to prevent the battery from being removed in an uncontrolled manner, and not add an excessive number of additional moving parts to the battery module design. The alternative embodiment, in FIG. 23A, includes two stops 603 and 604 located on either side of the module connected to the housing rack 300. There are also two tabs 605 and 606 on either side of the module. The stops 603 and 604 are meant to catch the battery tabs 605 and 606 along the rear of the sides of the module to prevent the battery from sliding out unexpectedly. The motion of the battery module 330 during removal in the alternative embodiment is shown in the FIG. 23A as the dashed section 607. The module 330 will be removed from the housing rack assembly 300 by gripping the handle 335 at the front of the module and sliding the case forward in the direction of arrow 608. The module will slide along the low friction slides 310, until the battery tabs 605 and 606 come into contact with the stops 603 and 604 on the housing rack assembly 300. The module 330 must then be lifted over the stops 603 and 604 to be completely removed in the direction of arrow 609. The installation motion in this alternative embodiment will require the exact reverse order of steps for removal.

Other alternative embodiments of this design may include, but are not limited to, a stop that allows the battery module 330 to pivot and rotate 90° downward so the battery can be lifted off a pivot rod by a handle at the rear of the module. Furthermore, the pivot rod is preferably connected to rotational dampeners positioned on either side of housing rack 300. These rotational dampeners will slow the rotation of the battery module 330 to its vertical lift-out orientation during removal which decreases the chance of damage to the battery module 330 or the housing rack 300. Alternate embodiments contemplated may include detents or latches on the exterior of the battery, but they will be implemented so as not to fail before the life of battery has ended.

Electrical Design of Battery Cell Network and Battery Module

FIGS. 24A and 24B show an isometric view of the top and bottom of the battery module 330, respectively. Each battery pack 330 is composed of a plurality of battery cells connected in series and parallel via wire bonding and ultimately terminating into an integrated BSS 700. The wire bonding will be completed using a method similar to the Tesla ultrasonic friction welding method. Although wire bonding has been widely used in other contexts such as with integrated circuits and discrete electronics, the battery industry has incorporated wire bonding that allows for bonding larger gauge wires than has previously been done. Both figures show a plurality of battery plates 701-709. The holes shown in each plate are used to wire bond the battery cells to the plates. In each hole a tiny wire will be bonded to both the plate and the battery cell. The plates are then used to directly the transfer the electric current through the interior of the battery module 330. The use of the plates prevents the entire battery module 330 from failing if one battery cell malfunctions because the other cells are still connected to the plate.

The plurality of cells is connected by the arrangement of plates 701-709 as shown in FIGS. 24A and 24B. There are four plates (702, 704, 706, and 708) located at the top of the interior of the battery module and five plates (701, 703, 705, 707, and 709) located at the bottom of the interior of the battery module.

Each plate alternates between positive battery cell arrangements and negative battery cell arrangements. For plates 702-708, this is roughly half of the geometric area of the space. In the alternative embodiment, each of these interior plates is in contact with 50 battery cells, with one half being a negative contact and the other half being a positive contact, and the most negative and most positive plates are in contact with 25 cells each. Plates 701 and 709 are only in contact with 25 cells as they are only in contact with the positive or negative ends of the battery cells. These plates are also directly connected to the battery terminals or the BSS. Plate 701 is connected to the BSS, which is then connected to the positive terminal 401. Plate 709 is connected to the negative terminal 402. The alternative embodiment contains 200 LFP battery cells. Alternate embodiments may contain variations of the arrangement or numbers of battery cells. This also implies that the plates in alternate embodiments could have different numbers, arrangements, or geometry than the alternative embodiment.

The flow of current through the battery cells alternates between the top and bottom of the module 330 as it works its way around the module 330 interior. The current flows from the positive terminal 401 to plate 701, located on the bottom of the battery module (FIG. 24B). Plate 701 is positively charged and in contact with only the positive end of the 25 battery cells above it. The negative ends of these battery cells are in contact with the negative portion of plate 702, located at the top of the battery module (FIG. 24A). The negative portion of plate 702 is shown by the dashed section 702a. The other half of plate 702, 702b, is in contact with the positive end of the 25 cells beneath it. The plate has contact with 25 negative battery cell ends, in 702a, and 25 positive cell ends, in 702b. Subsequently, the negative end of the battery cells for plate 703 are the same cells that have a positive connection with the 702b portion of plate 702. These cells have a negative connection to plate 703. The other half of plate 703 lies in the region of 704a. This region contains the positive contacts with the battery cells. Region 704b of plate 704 continues the pattern and has a negative connection to plate 705. The contacts here on plate 705 are negative. The other half of plate 705 is positively connected and the cells also have a negative connection with plate 706 in region 706a. The region 706b is positively connected on the top and on the bottom, is negatively connected to plate 707. The other half of the plate is positively connected and has a negative connection with 708a. The current passes through the positive connections in 708b. By the time the current reaches the negative plate 709, a negative voltage flows from the negative terminal 402.

The integrated BSS 700 monitors the health of the module 330 including cell voltage, current, and temperature. With respect to monitoring, in some embodiments, for purposes of monitoring the status of the battery modules 330, a display having multiple LED lights may be incorporated. For instance, the display may have seven (7) LEDs wherein five (5) of the LEDs show charge status in increments of 20% of charge ranging from 0% to 100%, based on the number of LEDs illuminated. The other two (2) LEDs may show status and trouble codes based on the color of illumination and/or by a series or pattern of blinking of the LEDs, wherein different blinking series or patterns relate to particular trouble codes. Furthermore, each display may incorporate a push button that may be used to query the status of the particular battery module 330, and also can be used to troubleshoot the battery module 330 by the number of presses of the button or by the duration of a button press. Each view (FIG. 24A-24B) shows a flex cable 710 wired along from the BSS 700 and the six-pin connector 400 to each of the sections of battery cells. The flex cable 710 will be used to wire all diagnostic instrumentation in the alternative embodiment to measure temperature, current, and voltage. Additionally, each module 330 will contain an arrangement of field-effect transistors (FETs) 711 in series with the battery cells to ensure the proper power handling. These switches are the aspect of the alternative embodiment that allow the module to be removed from the housing rack 300, as well as function as an active and resettable fuse element. The number of FETs 711 is based on the power capacity of the plurality of cells, and when removing the module 330 from the housing rack 300, they disable the power to the terminals. One alternative embodiment has twenty FETs 711, but other alternative embodiments of this design with different power capacities will understandably have a different number of FETs or the equivalent.

An alternative embodiment of the BSS 700 uses real-time battery cell information and compares this information to a set of reference values. It uses this comparison to determine abnormalities in individual battery cells and in the plurality of cells to diagnose the problem. The diagnostic information can be transmitted externally using a communication unit. The BSS 700 will also use this real-time data to prevent any issues during the battery operation by disconnecting the battery from the housing rack 300 electronically if it senses a problem.

During charging, the BSS 700 monitors the depth of discharge for each cell, compensates for voltage temperature differences, and ensures battery cells are properly balanced. If one battery cell has slightly more or slightly less capacity than the rest of the batteries, then its level of discharge will deviate from the other batteries over several charge and discharge cycles. The BSS 700 must balance the batteries to prevent over-discharge as well as over-charge deep discharge, which causes damage and eventually complete battery module failure and can present a safety risk.

The controller area network (CAN) communications protocol is used in the alternative embodiment as the main BSS. A CAN bus has error detection and fault tolerance, but has some significant materials cost and communications overhead. For transmitting information, various communication systems can be implemented. Other alternative embodiments can use industrial transmission interfaces such as serial peripheral interface (SPI), DC-BUS, or local interconnect networks (Lin Bus). The CAN in the alternative embodiment would interface with each BSS and be able to effectively monitor and control the performance of the entire battery housing rack. This prevents battery-to-battery performance issues and uses each module as effectively as possible. This way, the CAN allows the housing rack to interact with the VCU as a single unit rather than allowing each battery module to interact individually with the VCU. Furthermore, an isolated CAN scheme may be implemented that allows for communication with the battery modules in the "top" of the stack of battery modules, wherein those battery modules may be sitting at a potential that is some voltage higher than those battery modules that are lower in the stack.

Housing Rack and Battery Module Interface Design

FIG. 25 is a top view schematic diagram of the battery module showing the mechanism for removal and installation in the rack. The battery module 330 is removed by pressing a button 333 on the outside handle. The button 333 is meant to ensure that the module 330 remains in place during operation of the forklift. Pressing the button 333 releases the tension from the spring-loaded male connector 800, ejecting the male connector 800 from the female connector 801, and disconnecting the battery module terminals 401 and 402 from the housing rack terminals 802 and 803. The male connector 800 and the female connector 801 are the first to engage and the last to disengage. In FIG. 25, 800-803, 401, and 402 are symbolic representations for illustration purposes. The alternative embodiment of this portion of the system will be different sizes and more intricate, but accomplish the same task.

To install a removable battery module 330 within a slot-like bay 307 of the rack 300, the user first manually positions its back face in the opening for the corresponding bay 307 and then manually slides it rearward into that bay. Once the module 330 slides far enough in so that its back face contacts the spring loaded male connector 800, connector 800 begins to compress. After the connector 800 is completely compressed, the module 330 locks in place. It is contemplated that the connector 800 will be constrained from moving along the axis of insertion. The system is spring loaded to achieve pressure contact for the battery module terminals, 401 and 402, to the housing rack terminals, 802 and 803. The male connector 800 pushes a back switch which acts as the on/off mechanism for the system located within the female connector 801.

Additionally, there is a need to safely disengage the battery module from the housing rack before removing it completely to prevent arcing. Arcing leads to overcurrent and can cause destruction of the battery in the absence of proper safeguards. Particularly, if the battery module 330 is enabled (i.e., electrically connected) to the male connector 800 before it is physically connected to the male connector 800, and the voltage of each differs, then the moment the connectors 800 and 801 physically mate, there will be instantaneous high current to equalize the potentials. The goal is to ensure the high current connector is mated before enabling the battery module 330 and disabling the battery module 330 before it is disconnected. This can be achieved through a plurality of methods. One such method is to use the button 333 next to the handle to send a signal to the processor to disconnect power to the terminal. An alternative method uses a pressure-sensitive switch at the rear of the battery module and only when the battery is fully engaged with the connector will the battery be switched on. The relative dimensions of the switch and the power connectors will be such that the switch will protrude just far enough from the rear of the battery so that it is disengaged before the battery module is completely disconnected.

Another alternative method is through an electronic signal. As previously mentioned, the battery module will connect to the housing rack with both a pin connector and battery terminals. The electronic signaling method would require the pin connectors to be substantially shorter than the battery terminals, so that during the removal process, the pin connector will disconnect while the battery terminals are still connected. At this point, the battery module will detect that it is no longer connected to housing rack via the pin connector, and shut itself off instantaneously before the battery terminals are disconnected. It will be understood by those of ordinary skill in the art that mechanisms other than those employed in FIG. 25, or described as alternatives, can be employed in alternative embodiments. The purpose of the mechanism is for safety, notably to prevent arcing.

An additional feature of an alternative embodiment is reflected in the battery module 330 being compatible with prior art chargers used for recharging the conventional battery assemblies 160 (shown in FIG. 2) with which forklift 130 is designed to be used. Due in part to Applicant's design of lithium iron phosphate cell modules 330 that can be safely charged by conventional chargers when assembled in modules according to the embodiments, the character and structure of the modules 330 is such that the lithium-ion batteries are able to recharge with chargers currently used and already installed in warehouses that recharge conventional forklift batteries 160.

Charge Management Systems Integration

FIG. 26 is a schematic diagram an alternative embodiment where the eight battery modules 330a-330h are connected in parallel to the housing rack 300, which has its own BSS 901. At any particular point in time, each battery module 330 may have a different voltage, as suggested by the voltage numbers noted in FIG. 26, particularly as the module charges are drained through use in powering forklift 130. Each module may be at a different initial voltage due to differences in battery life or initial charge levels. In the example in FIG. 26, a couple of the modules have a fully charged voltage of 36.0 V, while others have lesser voltages as noted.

But for the control of BSS 901, in such scenarios where the voltage in one module exceeds the others, the lower voltage battery modules would draw a current flow from the higher voltage modules into the lower voltage modules that would be only limited by resistance of the connectors, cells, bus bars, and bond wires. A large difference in voltage, will cause high current flow to the battery module with lower voltage. These situations are undesirable because the current flow to the motor is reduced as current flows between battery modules, rather than out of the housing rack. If a high current is maintained for an extended period of time, or the voltage discrepancy is high enough such as to produce a current higher than the handling capability of the bond wires, it can also lead to battery failure by draining the battery rapidly or opening the bond wires.

For these reasons, the main BSS 901 in the housing rack 300 to the extent networked, is designed to monitor the voltages in each module and will disconnect a module that varies by more than a threshold of 0.10V. This allows the forklift to continue operating without hindering to performance. Specific 36 V battery modules are used as an example as alternative embodiments can use various voltages depending on the needs of the particular lift truck.

Other alternative embodiments of battery monitoring system architecture are contemplated within the scope of the present invention. In one embodiment, each battery module contains a PC board with a digital isolator and a multi-cell battery stack monitor. Each module has an independent interface connection to a controller board with a microcontroller, a CAN interface, and a galvanic isolation transformer. The microcontroller is able to provide the gateway to the forklift's main CAN bus and coordinate the modules.

In another alternative embodiment, each multi-cell battery stack monitor (MBSM) is on a PC board within each battery module. The BSS also contains a CAN transceiver and a galvanic isolation transformer. Each module communicates through the MBSM non-isolated SPI-compatible serial interface. This structure requires a 3- or 4-conductor cable connected between battery modules. Only one microcontroller controls all the battery monitors through the bottom monitor integrated circuit. This microcontroller also serves as the gateway to the forklift's main CAN bus.

Another contemplated embodiment has no monitoring and control circuitry within any of the battery modules. One PC board has 3 MBSM integrated circuits (for 3 modules), each of which is connected to a battery module. The MBSM devices are able to communicate through non-isolated SPI-compatible serial interfaces. One microcontroller controls all the battery monitors through the SPI-compatible serial interface and is the gateway to the forklift's main CAN bus. Similar to the preceding disclosed embodiments, a CAN transceiver and a galvanic isolation transformer complete the BSS.

Still Other Alternatives

Although the present invention has been described in terms of the foregoing disclosed embodiments, this description has been provided by way of explanation only, and is not intended to be construed as a limitation of the invention. For instance, despite reference to Class I forklifts as such, it should be understood that some aspects of the invention may have broader application with other types of battery-powered industrial trucks. Indeed, even though the foregoing descriptions refer to numerous components and other embodiments that are presently contemplated, those of ordinary skill in the art will recognize many possible alternatives that have not been expressly referenced or even suggested here. While the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention.

Accordingly, in all respects, it should be understood that the drawings and detailed descriptions herein are to be regarded in an illustrative rather than a restrictive manner, and are not intended to limit the invention to the particular forms and examples disclosed. In any case, all substantially equivalent systems, articles, and methods should be considered within the scope of the invention and, absent express indication otherwise, all structural or functional equivalents are anticipated to remain within the spirit and scope of the presently disclosed systems and methods.

What is claimed is:

1. A modular rechargeable battery system for use as a replacement of or as an alternative to a conventional lead-acid battery in a battery-powered industrial forklift truck, said modular rechargeable battery system being adapted to power the battery-powered industrial forklift truck, said system comprising:
 a) a plurality of battery modules, wherein each battery module in said plurality of battery modules includes a positive terminal and a negative terminal, a battery management system including a battery supervisor system (BSS), and a plurality of lithium-ion battery cells, said plurality of lithium-ion battery cells being electrically united with each respective one of said plurality of battery modules to provide a combined electrical potential between the positive terminal and the negative terminal of each respective one of said plurality of battery modules, wherein each of said lithium-ion battery cells is interconnected via wire bonding to a printed circuit board (PCB) on a top side of said lithium-ion battery cells;
 b) a housing having a plurality of compartments, each of said compartments being configured for removably receiving any one of said plurality of battery modules, said housing being sized and adapted to operatively fit within a battery compartment of the battery-powered industrial forklift truck, wherein each of said plurality of compartments includes a pair of power connections for mating connection to the positive terminal and the negative terminal of any one of said plurality of battery modules when said any one is removably received therein;
 c) said housing further comprising electrical conductors and external power terminals, said external power terminals being oriented and adapted for operative connection to the electrical power circuitry of the battery-powered industrial forklift truck, and said electrical conductors having a layout for connecting electric power from the pair of power connections of the plurality of compartments to said external power terminals;
 d) a processor for monitoring the modular rechargeable battery system and for controlling power switches such that operative electrical power is directed through said electrical conductors to said external power terminals, said processor being adapted to direct said operative electrical power to said external power terminals when fewer than all of said compartments have a corresponding one of said battery modules operatively received therein, whereby the battery-powered industrial forklift truck can be provided with operable electrical power when fewer than all of said compartments have battery modules removably received therein;
 e) a battery operating system supervisor (BOSS) module being adapted to grant permission to said BSS to connect or disconnect to at least one bus bar out of multiple bus bars, wherein said BOSS module is further adapted to communicate with said BSS using a controller area network (CAN) via an isolated wire harness, wherein said multiple bus bars include a 0 volt bus bar, a 24 volt bus bar, and a 48 volt bus bar; and
 f) with respect to each battery module, said BSS being adapted to:
  1) monitor operational aspects of said battery module;
  2) obtain real-time operational information of said battery module, said operational information comprising cell voltage, current, depth of discharge, and temperature; and
  3) compare said operational information with a set of predetermined reference values to determine if there are any operational abnormalities in said battery module, and when one or more abnormalities occur during operation of said battery module, said BSS is further adapted to electronically disconnect said battery module from said at least one bus bar, based at least in part on communication from said BOSS module, wherein said electronic disconnection is operatively performed by a Metal Oxide Semiconductor Field-Effect Transistor (MOSFET) associated with said battery module.

2. The modular rechargeable battery system as defined in claim 1, wherein said housing is sized and adapted to operatively fit within a battery compartment of a Class 1 forklift, and wherein each said battery module weighs 51 pounds or less.

3. The modular rechargeable battery system as defined in claim 1 wherein a thermally conductive gap-filling material is in thermal contact with a bottom surface of said lithium-ion battery cells, wherein said thermally conductive gap-filling material is not electrically conductive.

4. The modular rechargeable battery system as defined in claim 1 wherein each of said compartments is further configured such that said one battery module is removably received with said compartment in a vertical orientation.

5. The modular rechargeable battery system as defined in claim 1 wherein each of said compartments is further configured such that said one battery module is removably received within said compartment in a horizontal orientation.

6. The modular rechargeable battery system as defined in claim 1 wherein each compartment is defined by two lateral partitions and a door on the exterior side of said housing, said door having a latch for securing said door in a closed position, said door further having a hinge and cooperative pin for opening and closing said door.

7. The modular rechargeable battery system as defined in claim 1 wherein each battery module in said plurality of battery modules is separately rechargeable.

8. The modular rechargeable battery system as defined in claim 1 wherein said CAN is configured to receive and monitor diagnostic information from said plurality of battery modules.

9. The modular rechargeable battery system as defined in claim 1 wherein each said battery module includes a pin connector.

10. The modular rechargeable battery system as defined in claim 9 wherein said pin connector is recessed from a surface of said battery module relative to said positive and negative battery terminals.

11. The modular rechargeable battery system as defined in claim 1 wherein said lithium-ion battery cells are lithium iron phosphate (LFP) battery cells.

12. The modular rechargeable battery system as defined in claim 1 wherein:
   a) each of said battery modules weighs less than 51 pounds;
   b) each of said battery modules is separately rechargeable;
   c) a thermally conductive gap-filling material is in thermal contact between a bottom surface of said lithium-ion battery cells and a module enclosure for enabling heat transfer from said lithium-ion battery cells to the module enclosure for the purpose of thermal management, wherein said thermally conductive gap-filling material is not electrically conductive;
   d) each of said compartments being further configured to removably receive said one battery module in a vertical orientation;
   e) each said compartment is defined by two lateral partitions and a door on the exterior side of said housing, said door having a latch for securing said door in a closed position, said door further having a hinge and a cooperative pin for opening and closing said door;
   f) said CAN is configured to receive and monitor diagnostic information from said plurality of battery modules;
   g) each said battery module includes a pin connector, wherein said pin connector is recessed from a surface of said battery module relative to said positive and negative battery terminals; and
   h) said lithium-ion battery cells are lithium iron phosphate (LFP) battery cells.

13. The modular rechargeable battery system as defined in claim 1 wherein said housing further comprises additional external power terminals, said additional external power terminals being oriented and adapted for operative connection to an external power source, said external power source providing power for charging said plurality of battery modules while said plurality of battery modules are connected to said housing.

14. The modular rechargeable battery system as defined in claim 1 wherein said BOSS module is configured to enable hot swapping during continuous operation of the battery powered industrial forklift truck.

15. The modular rechargeable battery system as defined in claim 14 wherein:
   a) each of said compartments is further configured such that said one battery module is removably received with said compartment in a vertical orientation;
   b) each compartment is defined by two lateral partitions and a door on the exterior side of said housing, said door having a latch for securing said door in a closed position, said door further having a hinge and a cooperative pin for opening and closing said door;
   c) each said battery module includes a pin connector;
   d) said pin connector includes a 5 Volt pin, a CAN HI pin, a CAN LO pin, a ground pin, an identification pin, an interlock pin, a fan power pin, a fan speed pin, and a module ground pin; and
   e) a thermally conductive gap-filling material is located between a top side of said lithium-ion battery cells and a top battery tray, between said top battery tray and said PCB, and between a bottom side of said lithium-ion battery cells and a bottom battery tray, wherein said thermally conductive material is not electrically conductive.

16. A modular rechargeable battery system for use as a replacement of or as an alternative to a conventional lead-acid battery in a battery-powered industrial forklift truck, said modular rechargeable battery system being adapted to power the battery-powered industrial forklift truck, said system comprising:
   a) a plurality of battery modules, wherein each battery module in said plurality of battery modules includes a positive terminal and a negative terminal, an integrated battery supervisor system (BSS), and a plurality of lithium-ion battery cells, said plurality of lithium-ion battery cells being electrically united within each respective one of said plurality of battery modules to provide a combined electrical potential between the positive terminal and the negative terminal of each respective one of said plurality of battery modules, wherein each of said lithium-ion battery cells is interconnected via wire bonding to a printed circuit board (PCB) on a top side of said lithium-ion battery cells;

b) a housing having a plurality of compartments, each of said compartments being configured for containing any one of said plurality of battery modules, said housing being sized and adapted to operatively fit within a battery compartment of the battery-powered industrial forklift truck, wherein each of said plurality of compartments includes a pair of power connections for mating connection to the positive terminal and the negative terminal of any one of said plurality of battery modules when said any one is contained therein;

c) said housing further comprising electrical conductors and external power terminals, said external power terminals being oriented and adapted for operative connection to the electrical power circuitry of the battery-powered industrial forklift truck, and said electrical conductors having a layout for connecting electric power from the pair of power connections of the plurality of compartments to said external power terminals;

d) a processor for monitoring the modular rechargeable battery system and for controlling power switches such that operative electrical power is directed through said electrical conductors to said external power terminals;

e) a battery operating system supervisor (BOSS) module adapted to grant permission to said BSS to connect or disconnect to at least one bus bar out of multiple bus bars, wherein said BOSS module is further adapted to communicate with said BSS using a controller area network (CAN) via an isolated wire harness, wherein said multiple bus bars include a 0 volt bus bar, a 24 volt bus bar, and a 48 volt bus bar; and f) with respect to each battery module, said BSS is adapted to:
  1) monitor operational aspects of said battery module;
  2) obtain real-time operational information of said battery module, said operational information comprising cell voltage, current, depth of discharge, and temperature; and
  3) compare said operational information with a set of predetermined reference values to determine if there are any operational abnormalities in said battery module, and when one or more abnormalities occur during operation of said battery module, said BSS is adapted to electronically disconnect said battery module from said at least one bus bar, based at least in part on communication from said BOSS module, wherein said electronic disconnection is operatively performed by a Metal Oxide Semiconductor Field-Effect Transistor (MOSFET) associated with said battery module.

* * * * *